(12) United States Patent
West et al.

(10) Patent No.: US 11,214,469 B2
(45) Date of Patent: Jan. 4, 2022

(54) LIFTING DEVICES

(71) Applicant: THEODOSIER PTY LTD, Naremburn (AU)

(72) Inventors: James David Francis West, Artarmon (AU); Rory Campbell Kennard, Artarmon (AU)

(73) Assignee: MAKINEX IP PTY LTD, Artarmon (AU)

( * ) Notice: Subject to any disclaimer, the term of this patent is extended or adjusted under 35 U.S.C. 154(b) by 0 days.

(21) Appl. No.: 16/419,608

(22) Filed: May 22, 2019

(65) Prior Publication Data
US 2019/0270621 A1 Sep. 5, 2019

Related U.S. Application Data

(63) Continuation of application No. 14/400,840, filed as application No. PCT/AU2013/000544 on May 23, 2013, now abandoned.

(30) Foreign Application Priority Data

May 25, 2012 (AU) .................... 2012902155
Feb. 21, 2013 (AU) .................... 2013900585

(51) Int. Cl.
*B66C 23/48* (2006.01)
*B62B 3/06* (2006.01)
*B66F 9/065* (2006.01)

(52) U.S. Cl.
CPC ............ *B66C 23/48* (2013.01); *B62B 3/0612* (2013.01); *B62B 3/0618* (2013.01); *B66F 9/065* (2013.01); *B62B 2203/05* (2013.01); *B62B 2203/11* (2013.01); *B62B 2203/20* (2013.01)

(58) Field of Classification Search
CPC ..... B66C 23/48; B62B 3/0612; B62B 3/0618; B62B 2203/05; B62B 3/11; B62B 3/20; B66F 9/065
USPC ........................................... 254/9 R
See application file for complete search history.

(56) References Cited

U.S. PATENT DOCUMENTS

| 2006/0043041 A1* | 3/2006 | Lopes | B66C 23/48 212/175 |
| 2007/0295562 A1* | 12/2007 | Burton | B62B 5/0438 187/233 |
| 2013/0037768 A1* | 2/2013 | Hayes | B66C 23/48 254/327 |

* cited by examiner

*Primary Examiner* — David P Bryant
*Assistant Examiner* — Nirvana Deonauth
(74) *Attorney, Agent, or Firm* — W&C IP

(57) ABSTRACT

The present inventions provides a lifting device 101 comprising a main body 105 being of a generally elongate form, said main body 105 having at one end thereof a transport means 102, 120 to allow said device to translate relative to the ground, a boom portion 103 cooperating with said main body 105 and adapted to support a load at its end, a motive power means 115 to lift or lower said load, said main body 105 being able to be pivoted by a user with respect to a fulcrum 102, 120 formed by either said transport means 102, 120 and a ground location or said transport means 102, 120, around an axis generally parallel to the ground, to transfer or arcuately move a load carried by said boom portion 103, thereby providing a functionally variable horizontal reach 1013 to said device 101.

14 Claims, 29 Drawing Sheets

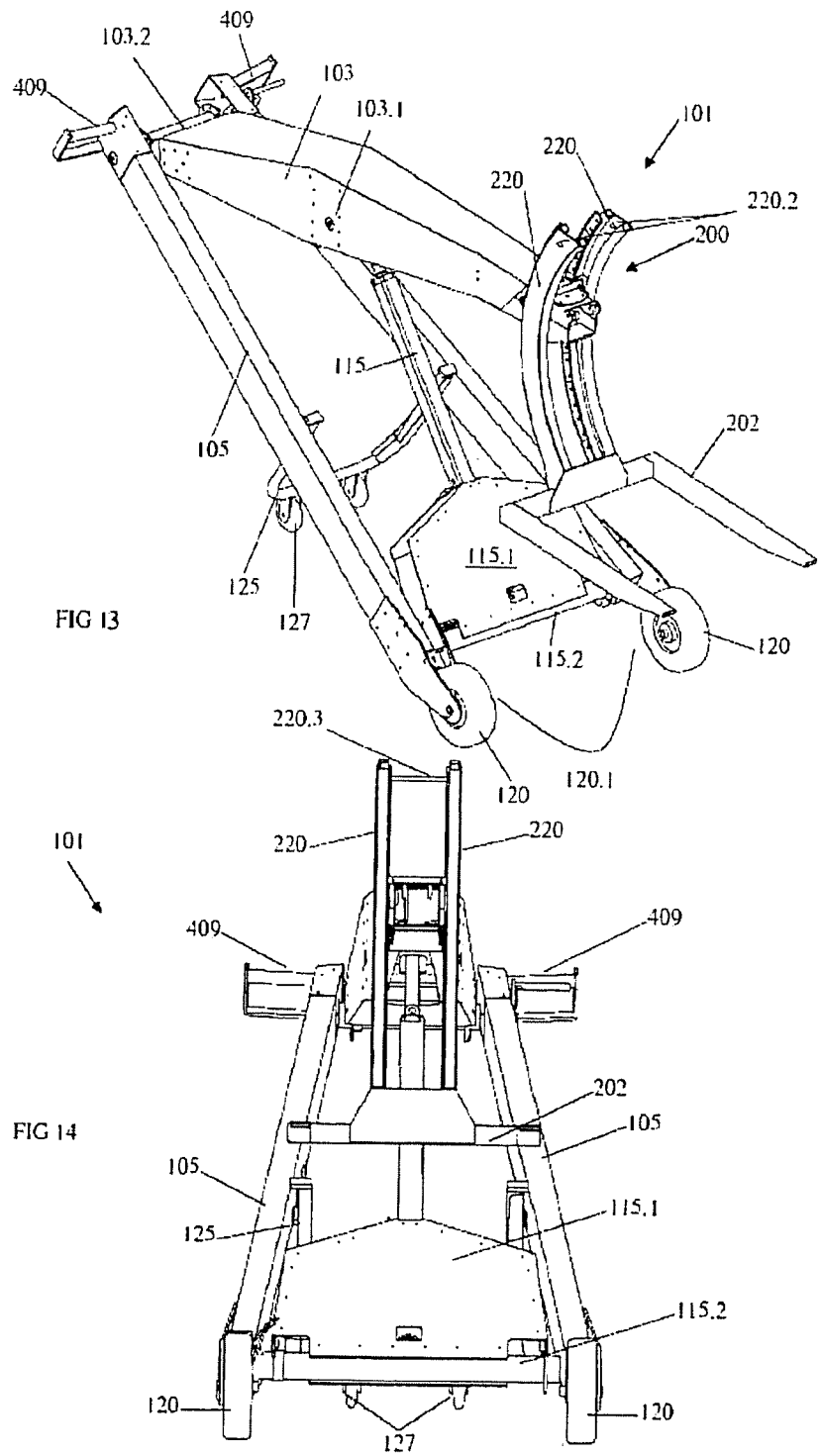

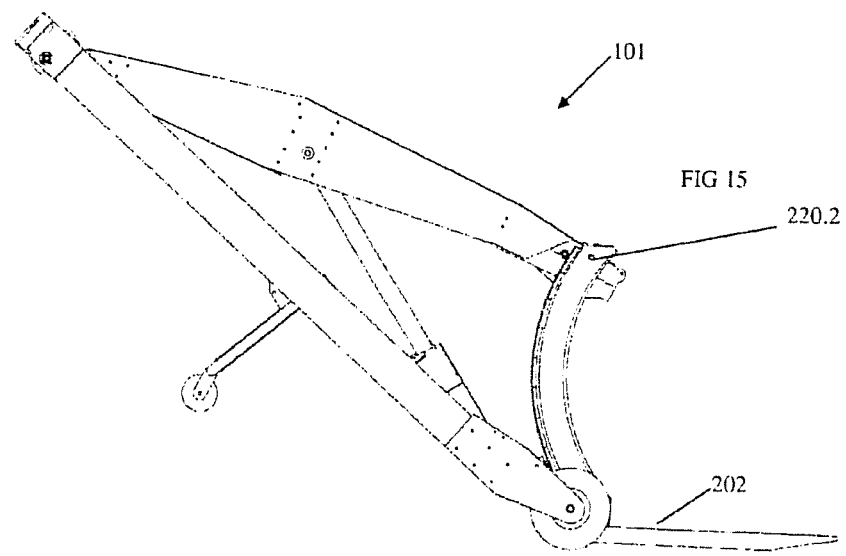
FIG 15
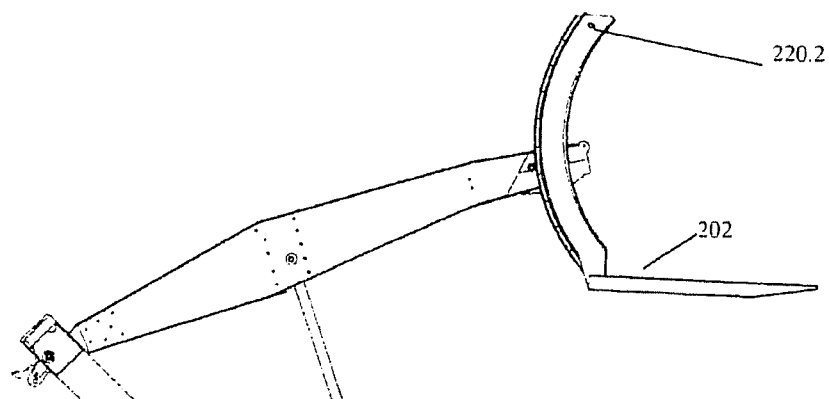
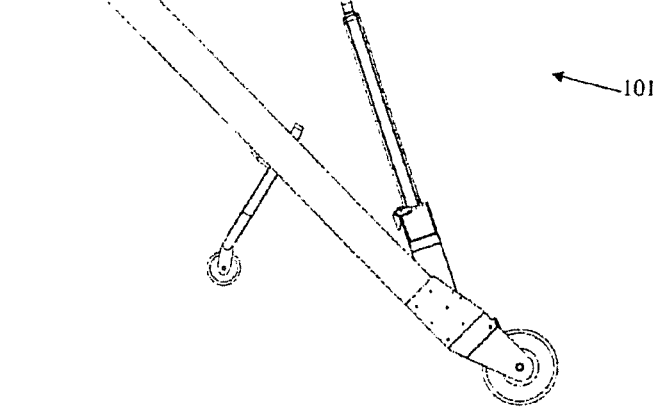
FIG 16

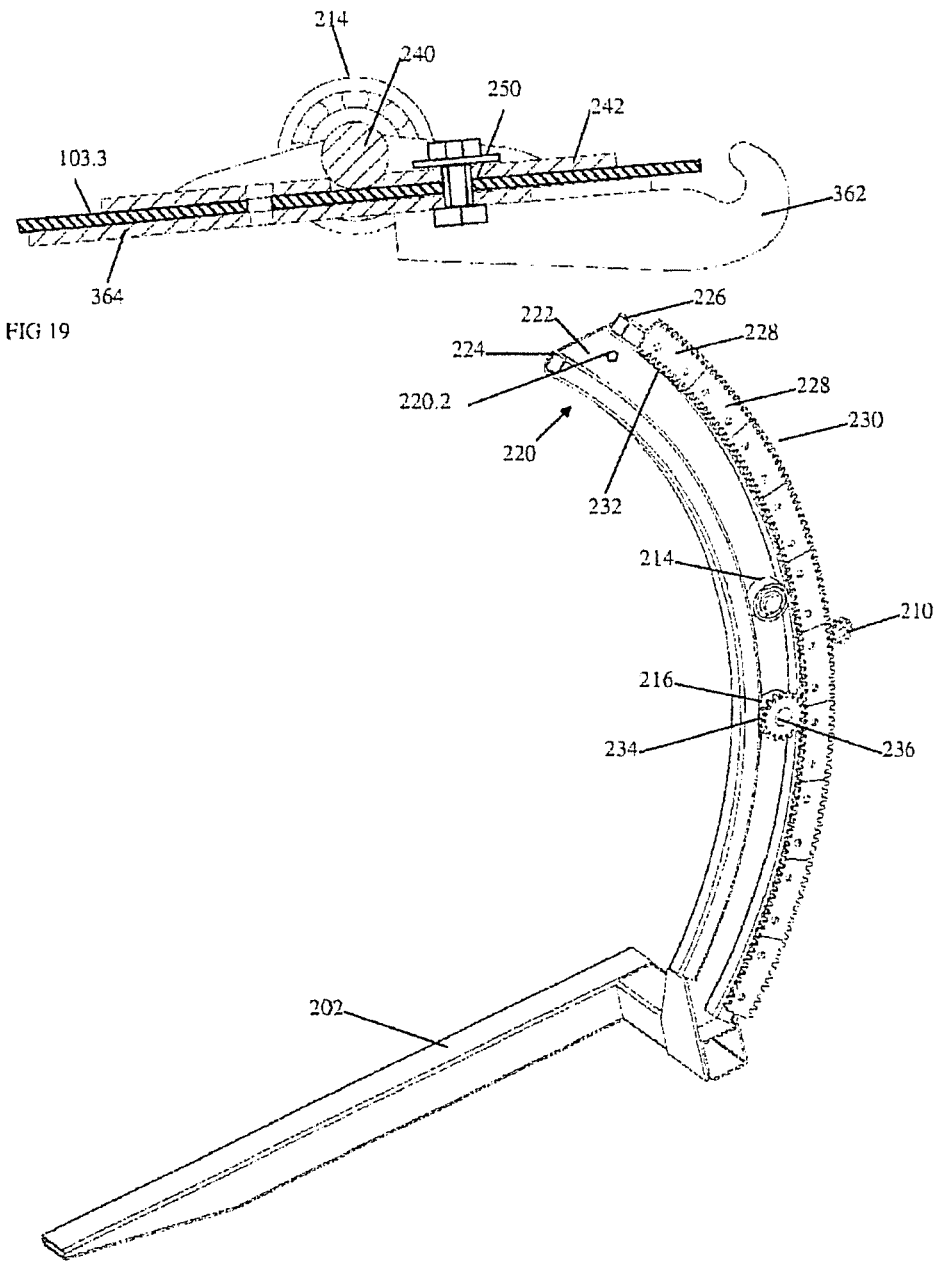

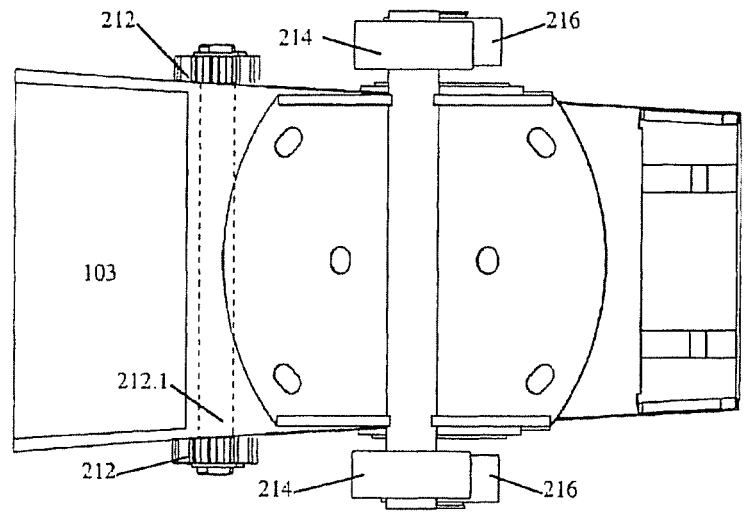
FIG 21
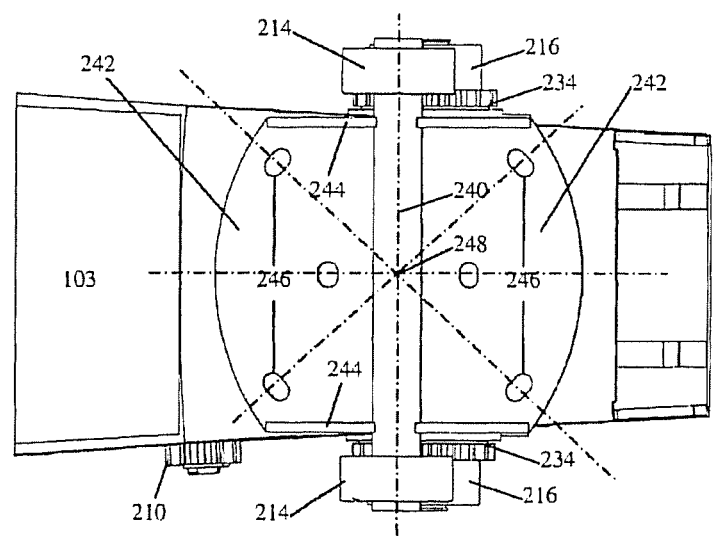
FIG 22
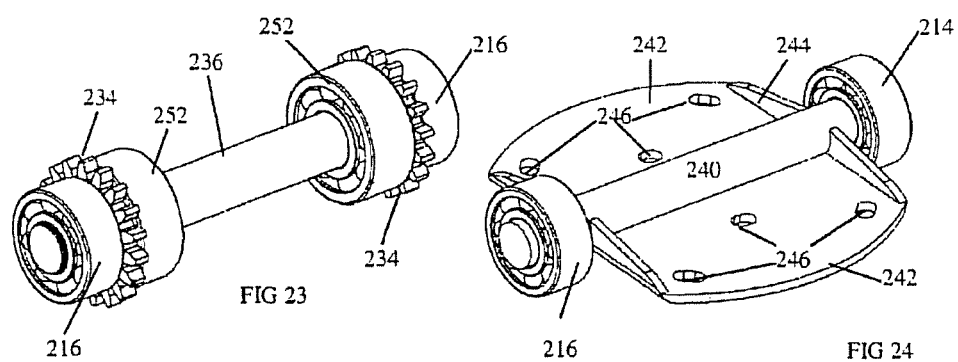
FIG 23
FIG 24

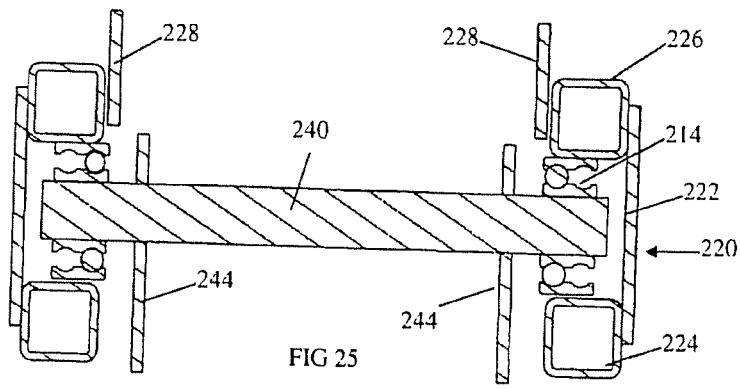
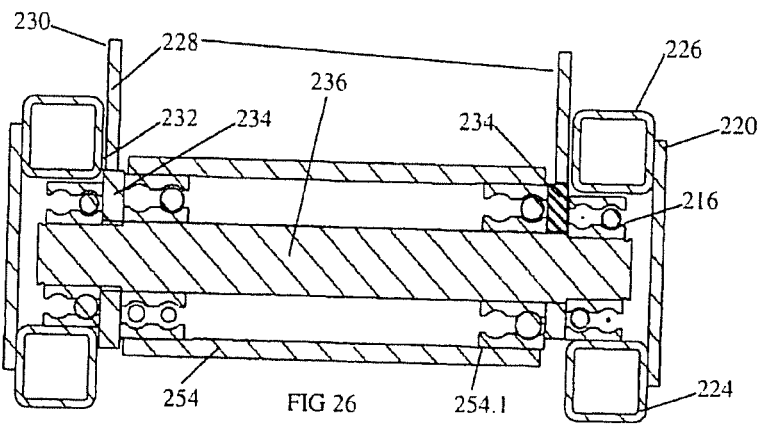
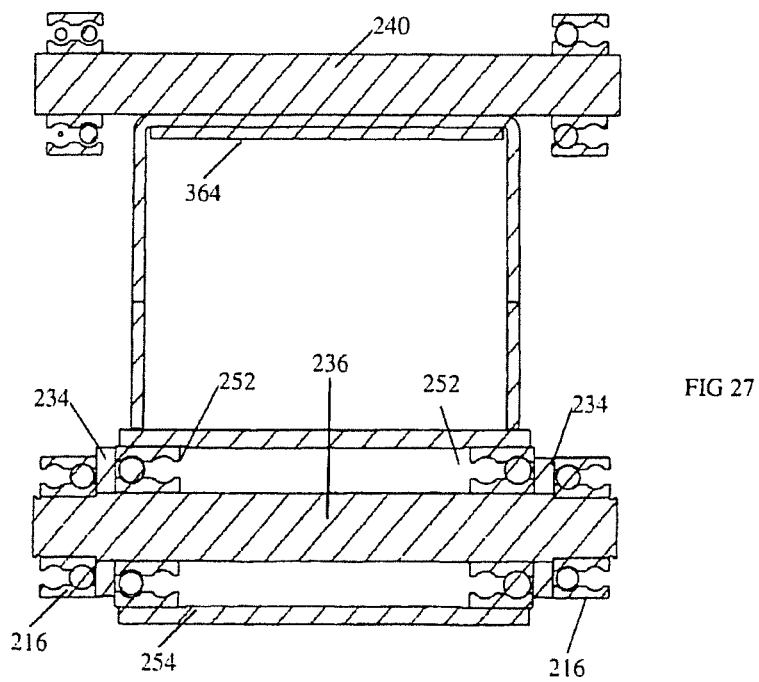

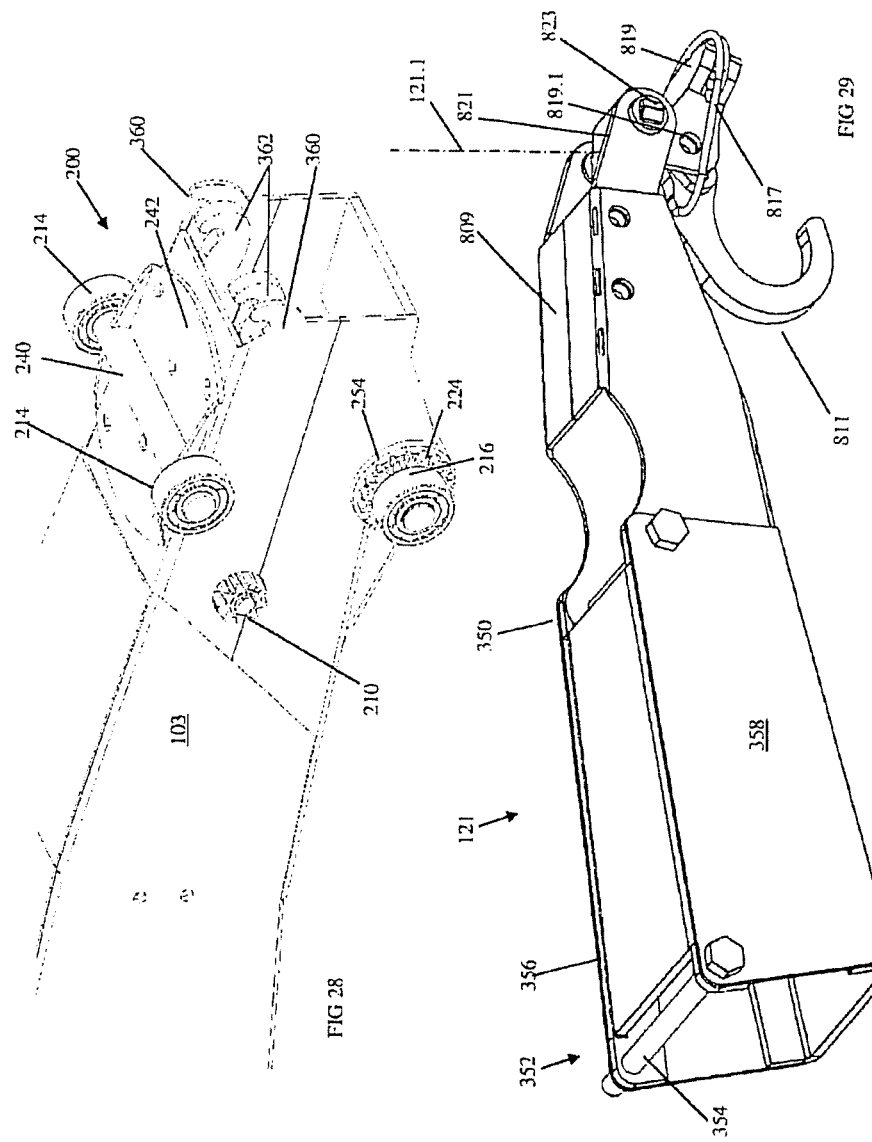

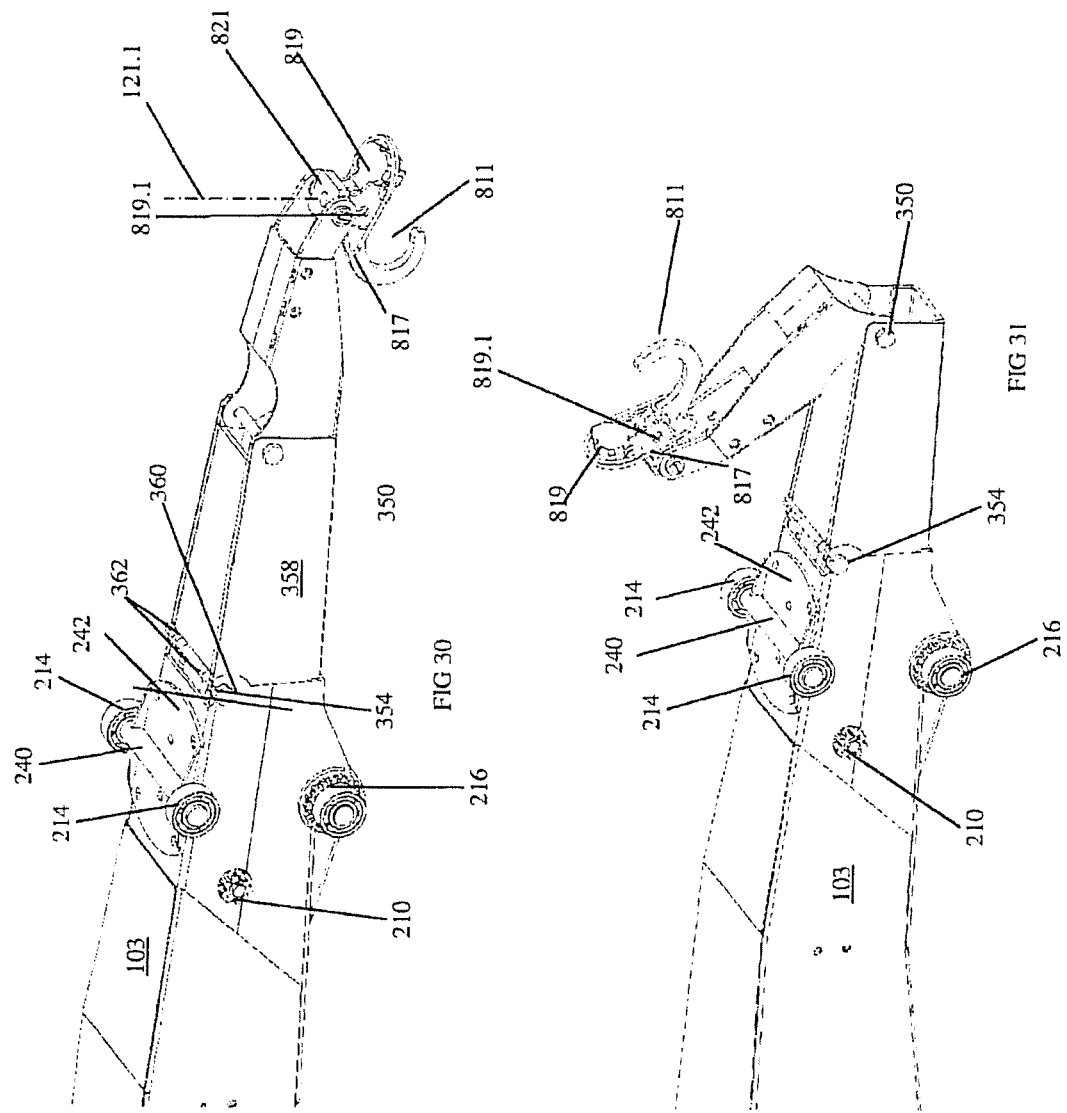

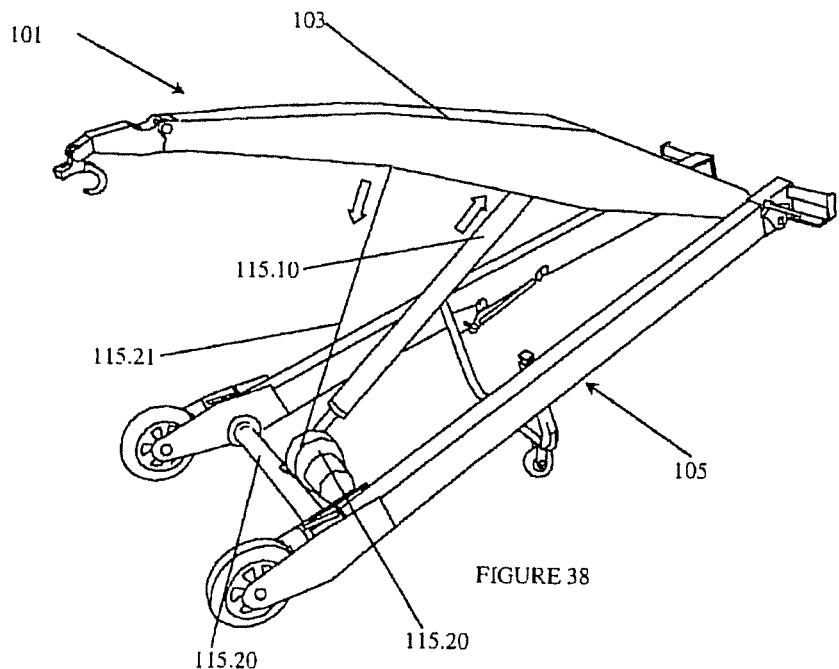
FIGURE 38
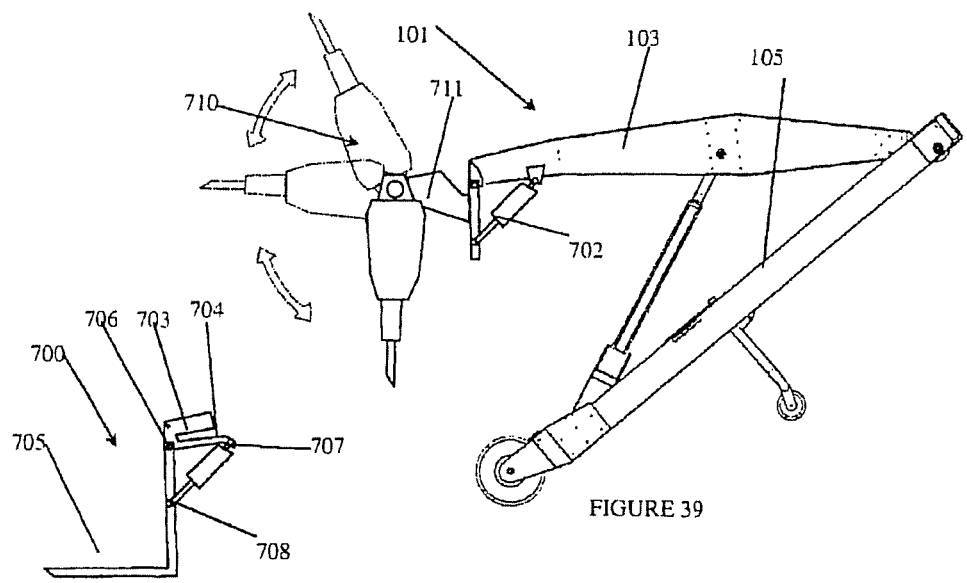
FIGURE 39
FIGURE 40

LIFTING DEVICES

TECHNICAL FIELD

The present invention relates to a lifting device. In particular, the present invention relates to a lifting device suitable for use by one person with improved pick and place functionality.

BACKGROUND

Lifting devices designed for lifting heavy objects such as items weighing between 40 kg and 120 kg are generally formed using a flat four-wheel base. The heavy object may then be attached to the lifting device and hoisted up using a crane like mechanism and either the centre of gravity of the load hangs within the footprint of the four wheels or the weight of the lifting device is enough to counterbalance the tipping effect of the load hanging outside the footprint of the wheels.

It may be a requirement to place a heavy object upon a surface that is higher than the surface upon which the heavy object was picked up from, for example, where the heavy object is picked up from the ground and placed upon the back of a vehicle. To allow the load to be positioned over the loading surface, the lifting device must in the first case be able to pass its wheels partially under the vehicle or in the second case must be a heavy enough machine to extend the load over the vehicle without tipping. These types of lifting devices are generally: slow; cumbersome to manoeuvre; limited by their inability to pass under a vehicle; heavy; and awkward. Essentially they are generally static and slow which causes manual lifting to be a more expedient solution in the workplace despite the risks associated. A 100 kg lift onto a vehicle is not uncommonly attempted as a two man lift for example.

Smaller manually operated lifting devices are generally not designed to carry heavyweights of the order of a person's bodyweight.

An object of the present invention is to provide an improved lifting device for use by a single user for lifting heavy loads while reducing the risk of injury to the user.

A further object of the present invention is to provide an improved lifting device to enable heavy loads to be moved from a first surface to a second surface where the second surface is either at the same level or different height than the first surface and to do so in such a way as to enable load balance when appropriate but also load reach forward of wheels when necessary without counterbalance weights added to the lifting device.

Each object is to be read disjunctively with the object of at least providing the public with a useful choice.

The present invention aims to overcome, or at least alleviate, some or all of the afore-mentioned problems.

Further objects and advantages of the invention will be brought out in the following portions of the specification, wherein the detailed description is for the purpose of fully disclosing the preferred embodiment of the invention without placing limitations thereon.

The background discussion (including any potential prior art) is not to be taken as an admission of the common general knowledge in the art in any country. Any references discussed state the assertions of the author of those references and not the assertions of the applicant of this application. As such, the applicant reserves the right to challenge the accuracy and relevance of the references discussed.

SUMMARY

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components that the use directly references, but optionally also the inclusion of other non-specified components or elements. It will be understood that this intended meaning also similarly applies to the terms mentioned when used to define steps in a method or process.

It will be understood that, when describing various integers, such as modules, components, elements etc., any integer may be constituted by a single integer or multiple integers.

The present invention provides a lifting device comprising a main body being of a generally elongate form, the main body having at one end thereof a transport means to allow the device to translate relative to the ground, a boom portion cooperating with the main body a motive power means to lift or lower the load, the main body being able to be pivoted by a user with respect to a fulcrum formed by either the transport means and a ground location or the transport means, around an axis generally parallel to the ground, to transfer or arcuately move a load carried by the boom portion, thereby providing a functionally variable horizontal reach to the device.

The functionally variable reach can include horizontal reach which is variable so as to provide offset distance between the load and the transport means to substantially counterbalance the weight of the load against the weight of the lifting device.

The functionally variable horizontal reach can include horizontal reach which is variable so as to provide a larger offset distance between the load and the transport means to engage or disengage the load at a position forward of the transport means.

The functionally variable horizontal reach can include varying horizontal reach at substantially all load heights the lifting device can achieve.

The boom portion can be one of the following: mounted on a lifting carriage that can traverse a vertically or partially vertical oriented mast fixedly mounted to the the main body; is pivotally mounted to the main body; is slidably and pivotally mounted to the main body; pivotally mounted to the main body at a location in the vicinity of a rear half of the main body; pivotally mounted to the main body at a location in the vicinity of the rear of the main body; is pivotally mounted to the main body and spaced from the transport means and adapted to rotate relative to the main body.

At an end of the main body, there is arranged a handle means for engagement by an operator.

The distance from the load support means to the handle is one of the following: generally the same as the distance from the handles to the fulcrum; more or less than the distance from the handles to the fulcrum by an order of no more than +−15%.

The device includes a means for manual manipulation of the lifting device to produce one or more of the following: rotation of the main body about the transport means; rotation of the main body about the transport means in a direction of urging of the load; rotation of the main body about the transport means in a direction opposite to a direction of urging of the load; translation of the main body relative to the ground; arcuate movement of the load; vertical movement of the load; lateral movement of the load; balance between the load and the weight of the lifting device; minimisation of applied control force needed to maintain the equilibrium of the lifting device when loaded; sufficient horizontal reach or offset distance for placing a load.

The transport means can be or have one or more of the following: a generally horizontal axis of rotation; made up of two transport means each having a generally horizontal axis of rotation whereby the axes of rotation are generally co-linear; a wheel; two wheels; more than two wheels; a roller, two or more rollers; an elongated endless track device; a triangular shaped endless track device.

The main body can have two spaced apart members and can have a transport means at the end of each member.

The main body can be constructed so that a space exists between two transport means.

The motive power unit can be one or more than one of the following: mounted to the main body at a location spaced from an axis of rotation of the transport means; mounted to the main body between the transport means; mounted to the main body at an axis of rotation of the transport means; pivotally connected to the boom and provides a linear extension and or contraction to rotate the boom away from or towards the main body; a linear actuator; a gas strut for lift force and a winch and cable for lowering force; a machine screw or power screw arrangement; a hydraulic cylinder or means; a pneumatic cylinder or means; a winch and endless cable loop to drive a carriage on the main body which slidably and pivotally carries either a link to the boom or the boom; manual means; a winch; a ratchet winch; winch and pulley system; a gas strut for lift force assistance and a linear actuator for lift and lowering forces.

A power source to drive the motive power unit can be one or more of the following: mounted to the main body; is part of an assembly which also includes control, recharging and battery power; a hydraulic pump to power a hydraulic cylinder; a pneumatic pump to power a pneumatic cylinder.

The boom portion can include one or more than one of the following: a load engager; lift formation; a load engager or lift formation which is removable or moveable with respect to the boom portion so as to be deployed or retracted or removed from deployment; a load engager or lift formation in the form of a hook means; a load engager or lift formation which is secured internally or externally relative to the boom portion; an implement mounting means for one of the following: forklift tynes, bale pins or tynes, barrel grab, container support, a lifting platform or surface, power tools, brick and or block lifters, suction devices; suction devices to lift concrete or masonry blocks, suction devices for handling glass panels, a jackhammer, or auxiliary powered devices; an implement such as one of the following: forklift tynes, bale tynes, lifting platform or surface, barrel grab, container support, a bucket, brick and or block lifters, a scraper, power tools, a jack hammer, auxiliary powered devices or other fixture to allow the addition of such things as power tools and suction devices, suction devices to lift concrete or masonry blocks, suction devices for handling glass panels; an implement mounting means wherein the implement and or an external reaction upon the implement places a load on the device via the implement mounting means.

The lifting device can include a braking mechanism which is one of the following: selectably engageable to restrict, allow or halt relative movement between the transport means and the main body; selectably engageable to restrict, allow or halt relative movement between the transport means and the ground; cooperates with the transport means to allow rotation of the body relative to a ground location when the braking mechanism is engaged and prevents movement between the transport means and the main body.

The main body can include two spaced apart members and can have a transport means at the end of each member.

The main body can be constructed so that a space exists between two transport means.

The main body can includes at least one of the following: a jockey wheel or wheels; centrally located jockey wheel or wheels; retractable jockey wheel; centrally located retractable jockey wheel or wheels.

The lifting device can include a hook means which is one or more of the following: rotatably mounted to the lifting device about a vertical axis; rotatably mounted to the lifting device about a horizontal axis; spring biased about a horizontal axis.

The present invention also provides an implement mounting system comprising an implement means, a drive means to move the implement means with respect to a boom or other lifting device on which the implement mounting system is mounted and rotatable mounting means associated with the boom or other lifting device to allow the implement means to translate relative to the boom and or other lifting device.

The implement means can perform one of the following: translates in an arcuate path; translates in an arcuate path with a virtual centre of rotation forward of the rotatable mounting means associated with the boom or other lifting device.

The implement means can be an implement mount which allows the following to be operatively connected thereto: forklift tynes, bale pins or tynes, barrel grab, container support, a lifting platform or surface, a power tool, a brick and or block lifter, a suction device, a suction device to lift concrete or masonry blocks, a suction device for handling glass panel, a bucket such as a bucket for earth moving, a jackhammer, a concrete cutter, a drill, a tile remover, an auxiliary powered device; or said implement means is an implement such as one of the following: forklift tynes, bale tynes, lifting platform or surface, barrel grab, container support, a bucket such as a bucket for earth moving, a brick and or block lifter; a scraper, a jackhammer, a concrete cutter, a drill, a tile remover, an auxiliary powered device, a power tool, a suction device, a suction device to lift concrete or masonry blocks, a suction device for handling a glass panel; other fixture to allow the addition of such things as power tools.

The implement means can include at least one arcuate track which engages the rotatable mounting means.

The arcuate track can include one or more of the following: along, at least one periphery thereof, a series of gear teeth; along a second periphery thereof another series of gear teeth.

The rotatable mounting means can include at least one of the following: at least one driven pinion gear; at least two rollers; at least two rollers wherein at least one of the rollers includes a gear on the same axle thereof.

The implement means can include two arcuate tracks which are spaced apart so as to receive an end of a boom therebetween.

The drive means can include one of the following: two driven pinions each to engage a respective gear on respective arcuate tracks; a single driven pinion engaging only a single track; or a single driven pinion engaging only a single track with a shaft having fixed gears thereon to engage gears on each track of the system.

The present invention also proves lifting device as described above, having an implement mounting system also as described above.

The present invention also provides a manually operated lifting device comprising a main body, a hoist arm (or boom), a rotatable support, a load lifting point, a manual manipulation point, an actuator and a brake wherein: the rotatable support is in connection with a first distal end of the main body and the manual manipulation point is positioned generally towards a second distal end of the main body that opposes the first end; a first distal end of the hoist arm (boom) is in pivotal communication with the second distal end of the main body and the load lifting point is in connection with a second distal end of the hoist arm (boom) that opposes the first end of the hoist arm (boom); the actuator is arranged to pivot the hoist arm (boom) generally about the main body to adjust the pivotal distance between the hoist arm (boom) and the main body; and the brake is arranged to operate in a first mode of operation where the rotatable support is rotatable with respect to the main body and a second mode of operation where the rotatable support is fixed with respect to the main body.

The rotatable support can comprise at least one rotating element that is arranged to rotate with respect to the main body in the first mode of operation.

The brake can be adapted to stop the rotating element from rotating with respect to the main body when in the second mode of operation.

The rotatable support can comprise two rotating elements arranged to rotate relative to the main body in the first mode of operation.

The brake can be adapted to stop at least one of the two rotating elements from rotating with respect to the main body when in the second mode of operation.

The main body can comprise two longitudinal members extending between the manual manipulation point and the rotatable support, and one or more interconnecting support members extending between the two longitudinal members.

A first distal end of each of the two longitudinal members can be in connection with the manual manipulation point and a second distal end of each of the two longitudinal members is in connection with the rotatable support, wherein a first interconnecting support member is positioned between the first distal ends of the two longitudinal members.

A first distal end of each of the two longitudinal members can be in connection with the manual manipulation point and a second distal end of each of the two longitudinal members is in connected with the rotatable support, wherein a second interconnecting support member is positioned between the second distal ends of the two longitudinal members.

A first distal end of the actuator can be attached to the second interconnecting support member and a second distal end of the actuator is attached to the boom.

The lifting device can further comprise one or more actuator controllers for controlling the position of the actuator.

The actuator can be an electric actuator.

The brake can further comprise a brake controller attached to the manual manipulation point and adapted to engage or disengage the brake dependent on the mode of operation.

The load lifting point can comprises a hook comprising a first end in pivotal and rotatable communication with the boom, a second end for receiving the load and a curved portion formed between the first and second ends, wherein the curved portion has an internal surface for supporting the load and the internal surface is orientated away from the boom; and a biasing means that is arranged to bias the hook towards the boom.

The hook can be attached to the second distal end of the boom.

The lifting device can further comprise a support member connected to the main body and adapted to extend from the main body to enable the main body to be supported away from the surface upon which the lifting device is located.

The support member can be pivotally connected to the main body.

The support member can further comprise at least one rotating element upon which the lifting device can be at least partially supported.

The lifting device can be adapted to enable a user to move the manual manipulation point in a vertical central longitudinal plane and/or a horizontal plane relative to a first surface upon which the lifting device is located to engage a load with the load lifting point, lift the load from the first surface using the boom, move the load and disengage the load from the load lifting point with assistance by selectively operating the brake in the first and second modes of operation.

The load can be disengaged onto the first surface, or a second surface that is higher, lower or substantially the same than the first surface.

BRIEF DESCRIPTION OF THE DRAWINGS

Embodiments of the present invention will now be described, by way of example only, with reference to the accompanying drawings, in which:

FIG. 13 illustrates a perspective view of the device of FIG. 12 including a lifting implement.

FIG. 14 is a front view of the apparatus of FIG. 13;

FIG. 15 is a side view of the apparatus of FIG. 13 when the lifting implement is in a lowermost condition and with reach extended forward of wheels;

FIG. 16 is a side view of the apparatus of FIG. 13 when the boom arm is rotated to its full height and reach is extended forward of wheels;

FIG. 19 is a detailed view of a portion of the boom;

FIG. 20 illustrates in detail a portion of the arcuate construction of the implement mechanism.

FIG. 21 illustrates a plan view of the end of the boom of a first embodiment;

FIG. 22 illustrates a view similar to that in FIG. 21 of another embodiment;

FIG. 23 illustrates the lower gear and roller of FIG. 22;

FIG. 24 illustrates the mounting plate and upper roller of FIGS. 21 and 22;

FIG. 25 illustrates a cross-sectional view of the implement mount and upper bearing and shaft of FIG. 24;

FIG. 26 illustrates a cross-sectional view through the implement mount and lower bearing, gear plate and shaft of FIGS. 23 and 22;

FIG. 27 illustrates a cross section through the boom also through the upper and lower shafts of FIGS. 25 and 26;

FIG. 28 illustrates a detail perspective view of the end of the boom;

FIG. 29 illustrates the hook attachment to engage the end of the boom in FIG. 28;

FIG. 30 illustrates a perspective view of the apparatus of FIG. 29 connected to the boom end in FIG. 28;

FIG. 31 shows partial angular retraction of the tip of the apparatus of FIG. 29;

FIG. 38 illustrates a perspective view of another lift device embodiment where lift force is provided by a gas strut and lowering force is provided by a winch;

FIG. 39 illustrates the lift device of FIG. 1, being a purpose built lift device to carry a jack hammer mounted on rotating carriage, which has its own motive power unit to tilt, which is powered from the lift device or powered from the same power supply for the jack hammer;

FIG. 40 illustrates a self powered tyne implement for connecting to or use with the lift device of FIG. 12;

DESCRIPTION OF EMBODIMENTS

The lifting device as described herein is adapted specifically for use by a single operator, and enables the operator to easily manoeuvre heavy loads such as loads weighing up to approximately 120 kg to 140 kg. In certain scenarios, the operator is able to manually manoeuvre heavy loads from a position located in front of the wheels to a position clear of the ground, above the wheels and substantially in overall balance with the device merely by raising or lowering one end of the lifting device to cause the lifting device to pivot. In addition, the pivot of the hoist arm (or boom) relative to the main body is adjustable via a powered reversible mechanism to lift the load against gravity and or add to the user's control over the horizontal and vertical position of the load with respect to the wheels, which in combination with manual manoeuvring of a heavy loads enables the operator to move a heavy load between surfaces having different heights, as will be explained in more detail below.

Figure 1:
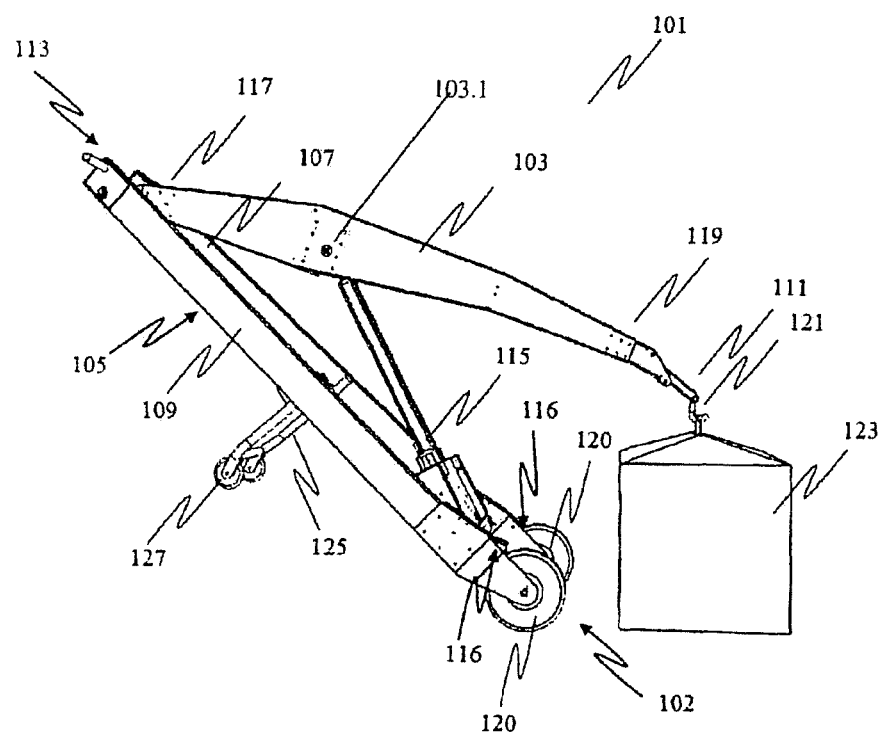
FIG. 1 shows a view of a lifting device engaging with a load according to an embodiment of the present invention.

FIG. 1 shows a view of a manually operated lifting device 101 engaging with a load according to this embodiment. According to this view, the load is located upon a surface which is substantially the same height as the surface upon which the lifting devices located.

The lifting device 101 has a main body 105 of approximately 1.9 metres in length, including a first longitudinal member 107 and a second longitudinal member 109, a load lifting point 111, a manual manipulation point 113 at one end and a rotatable support 102, a hoist arm or boom 103, an electric actuator 115 controlled by actuator controls (not shown) and brakes 116 controlled by brake controls (not shown). In general terms the main body 105 and rotatable support or transport means 102 (namely two wheels 120) of the lifting device 101 is of a construction similar to that of a two wheeled hand cart and provides the manoeuvrability benefits of such hand carts.

The manual manipulation point 113 is located in the general vicinity of a first end of the first longitudinal member 107 and a first end of the second longitudinal member 109. That is, the manual manipulation point is located in the general vicinity of the end of the main body that opposes the end where the rotatable support is located.

According to this embodiment, the manual manipulation point includes two handles available for a user to hold onto in order to manually control, manoeuvre and pivot the lifting device as described herein.

It will be understood that, as an alternative, the manual manipulation point may be positioned in any suitable location near the first ends of the longitudinal members, or indeed anywhere else within that region to enable a user to pivot the lifting device in the vertical central longitudinal plane.

A first end 117 of the hoist arm or boom is in the vicinity of the manual manipulation point 113. A second end 119 of the boom is in connection with the load lifting point 111. A first interconnecting support member in the form of a pivotal support bar 405 (see FIG. 4) is connected between the first ends of each of the first and second longitudinal members (107 and 109) in the general vicinity of the manual manipulation point. The connection of the pivotal support bar 405 is a rigid connection to the members 107 and 109, so as to provide the main body with as strong and or rigid a frame work as possible. The first end of the boom 103 is rotatably connected to the pivotal support bar 405 to enable the boom to pivot substantially with respect to main body.

A second interconnecting support member or pivot bar 115.2 provides support for the actuator 115 is located between the second ends of the two longitudinal members.

The rotatable support or transport means 102 includes two rotatable elements in the form of wheels 120 which are spaced approximately 750 mm apart. The wheels 120 are connected to the second ends of each of the first and second longitudinal members (107 and 109) via axles. Therefore, the wheels 120 are arranged to rotate with respect to the main body when the brake is not engaged, i.e. when the brake is operating in a first mode of operation. When the brake is engaged, i.e. when the brake is operating in a second mode of operation, the wheels are unable to rotate with respect to the main body and so the wheels and main body (i.e. including the longitudinal members) are in a fixed position relative to each other.

Effectively, the rotatable support or transport means 102 is connected to an end of the main body and the manual manipulation point is formed at or connected to the opposite end of the main body.

A hook system 121 is attached to the second end of the boom 103 at the load lifting point 111. Further details of the hook system are provided below.

A load 123 can therefore be attached to the hook 121 via a corresponding eyelet affixed to the load 123.

According to this embodiment, a support member 125 in the form of a generally U-shaped tube is connected to an under portion of the main body via the first and second longitudinal members (107 and 109). Two rotating elements in the form of wheels 127 are attached to the support member 125.

The support member 125 is located approximately halfway along the length of the main body. The support member 125 is pivotally connected to the main body via the first and second longitudinal members. That is, the support member 125 may be rotated with respect to the longitudinal members to extend away from the main body to utilise the support member or retract towards the main body when the support member 125 is not required.

The support member is adapted to enable the lifting device to be at least partially supported upon a surface via the wheels 127 without the main body being placed directly upon that surface. The wheels 120 of the rotatable support 102 also at least partially support the lifting device upon the surface. The support member is intended to support the device only when it is not loaded. However it is positioned so that it doesn't generally obstruct the user or device during use and so can be left in a down position during loading and unloading. When the device is in an unloaded condition, the wheels 127 when deployed can decrease significantly the turning circle of the device. This can be done by the user lifting the front wheels 120 by pivoting the handles downwardly so as to rotate the device around the horizontal axis provided by the wheels 127 and the support member 125, and then, with the wheels 120 off the ground, by turning the device laterally around on the wheels 127. This helps to increase the manoeuvrability of the device in the unloaded condition.

According to the view in FIG. 1, the electric actuator 115 is shown towards a minimum extension. This means that the distance between the end of the boom, i.e. the load lifting point 111, and the rotatable support is towards a minimum.

In order to engage the load 123 by locating the hook 121 through the eyelet attached to the load, the lifting device is first manually manoeuvred into position by a user ensuring the brake is disengaged and moving the lifting device upon the rotatable elements 120 into close proximity with the load 123. This movement effectively moves the lifting device within the horizontal plane. In addition, the lifting device is moved in a vertical central longitudinal plane through the actions of the user lowering or raising the handles of the manual manipulation point 113. In addition the distance from the hook 121 to the rotatable support 120 can be varied by control of the actuator. It would therefore be understood that the load lifting point and hook 121, can be manoeuvred in three dimensions in order to enable the hook to engage the eyelet of the load.

After engaging the load, the load may be raised up from the surface merely through a combination of raising the boom with the actuator and or pivoting the main body of the lifting device by moving the handles up or down in the vertical central longitudinal plane. Pivoting the main body of the lifting device by moving the handles up or down in the vertical central longitudinal plane can be achieved in two ways, namely either with or without engaging the brake. For example, the user may allow the wheels 120 to move forwards away from the user, by the user enabling the handles to be lowered towards the surface in a general vertical orientation. This has the effect of lifting the load 123 up from the surface, as well as moving the load more directly over the wheels.

It will be understood that, an alternative way of raising the load would be to engage the brake so it is operating in the second mode of operation such that the wheels 120 are fixed in position relative to the longitudinal members (107 and 109). Therefore, the wheels 120 are unable to travel freely across the surface but instead are only able to pivot about the point upon which they rest. The pivoting action is caused by the user lifting or lowering the handles in order to pivot the boom only in the vertical central longitudinal plane via the wheels 120 and main body. As with the first option the user may choose to raise the boom during the procedure by controlling the actuator.

The user may determine which of the two options above may be utilised dependent upon the weight, height and position of the load. It will be understood that when the boom is raised under load, the best control of any counterbalancing required is achieved by having the brakes on.

Figure 2:
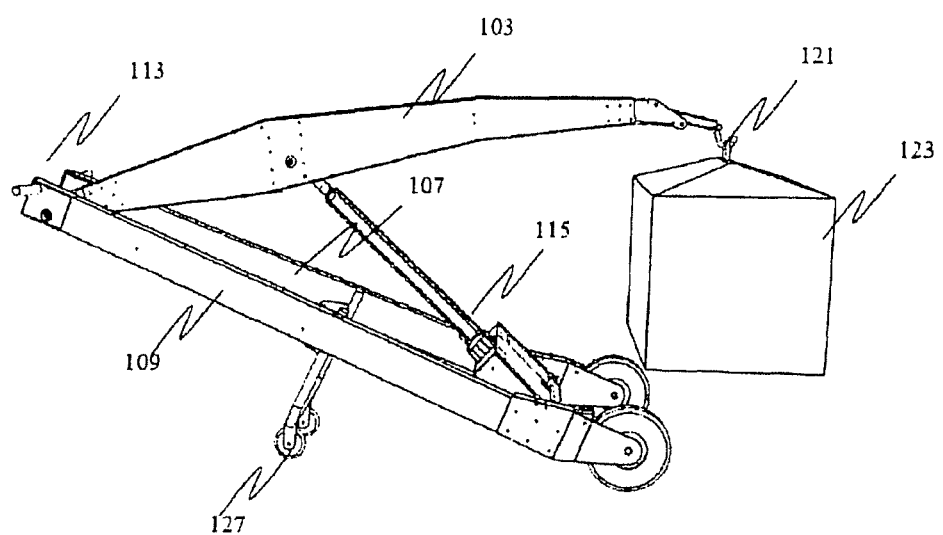
FIG. 2 shows a view of a lifting device holding a load in a low position according to an embodiment of the present invention.

FIG. 2 shows a view of the lifting device holding the load in a low position above the surface. Whilst the support member is shown in a position where the wheels 127 are close to the ground, there will generally be no weight on the wheels 127 because the user's hands will position the handles so that the wheels 127 are at least slightly off the ground. In this position the load, depending upon its mass, will generally be counterbalanced by the weight of the machine and require further counterbalancing assistance from the user's hands in the form of a relatively small amount of downwards or upwards pressure or force applied to the handles, depending upon the load's mass. The wheels 127 are only for supporting the lifting device when the lifting device is unloaded. With the brakes disengaged, the lifting device may be moved upon the surface by an operator applying pressure to the handles of the manual manipulation point 113 in the direction in which they want the lifting device to move.

Figure 3:
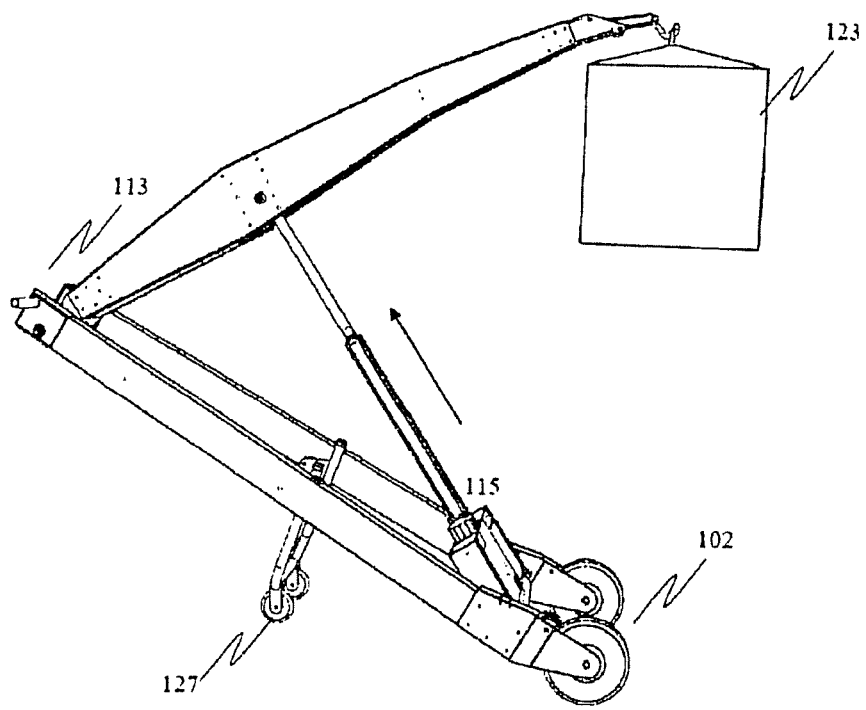
FIG. 3 shows a view of a lifting device lifting a load according to an embodiment of the present invention.

FIG. 3 shows a view of the lifting device lifting the load up off the ground (upon which the lifting device is located) and into the air. The distance between the end of the boom at the load lifting point 111 and the rotatable support 102 may be increased by applying power to the electric actuator 115 to increase its extension. By increasing the extension of the electric actuator 115, the boom is pivoted generally about the manual manipulation point to adjust the pivotal distance between the boom and the main body (i.e. including the longitudinal members).

For a high surface disengagement the load may be moved by the user towards the load's desired resting position although at some distance back from the edge of the high surface by engaging the brake to fix the wheels 120 in position relative to the main body, and then allowing the device to tip forwards whilst using bodyweight to counterbalance the increasingly off-centre load. Applying the brakes makes the counterbalancing applied at 113 more manageable. This has the effect of horizontally pivoting the boom only in the vertical central longitudinal plane via the rotatable support, which moves the load predominantly horizontally away from the wheels over the platform, effectively increasing the offset distance and thus applying functional horizontal reach to position the load. Then, when the load is positioned over the platform, the actuator is retracted to lower the boom and therefore the load to the desired position. With a combination of the controlled extension of the electric actuator and the above described pivoting movement, the reach of the boom is capable of placing the load upon a surface which is higher than the surface from which the load was originally taken.

Therefore, in summary, to move a load from a first location at a first height to a second location at a second height greater than the first height the load is engaged through a combination of enabling the boom to move upon the wheels to cause the lifting device to move in the horizontal plane, and adjusting the height of the boom and pivoting the boom relative to the rotatable support to cause the boom to move in the vertical central longitudinal plane.

The user is then able to manipulate the lifting device to locate the hook on the boom so that it passes through the eyelet on the load without any assistance from anyone else. After the load is attached to the hook, the load may be moved from the lower surface by applying the brake and extending the electric actuator. It will also be understood that the user may alternatively or in addition pull back on the handles of the manual manipulation point to pivot the boom on the wheels. Once the load has been cleared of the ground, the lifting device may be moved upon the wheels (with the brake disengaged) to the area where the load is to be deposited.

The load may be lifted to greater heights through a combination of adjusting the height of the boom relative to the rotatable support, and applying the brake. Applying the brake both stops the wheels from rotating relative to the main body and pivots or arcuately translates the boom only in the vertical central longitudinal plane via the rotatable support thereby making controlling the load at height more manageable. That is, the application of the brakes will also ensure degrees of freedom of the lifting device are limited such that the load will be able to move only around the generally horizontal axes of the lifting device fulcrums.

Once the load has been placed upon the desired surface, the user is able to manipulate the boom so that the hook is unhooked from the eyelet on the load. The lifting device may then be moved away from the load and the boom lowered by operating the electric actuator to reduce the extension of the actuator.

It will be understood that the reverse operation of the above may be used to lift the load from the higher surface to move it to a lower surface. That is, in summary, a load may be moved from a first location at a first height to a second location at a second height less than the first height by: engaging the load through one or more of i) moving the lifting device upon the rotatable support to cause the lifting device to move in a horizontal plane, ii) increasing the height of the boom relative to the rotatable support to cause the boom to move in a vertical central longitudinal plane so that the lifting point of the boom is generally aligned with the lifting point of the load, and iii) controlling the manipulation point to cause the boom to pivot upon the wheels and enable the lifting point of the boom to reach out towards the load upon the higher surface.

The user is then able to manipulate the lifting device to locate the hook on the boom so that it passes through the eyelet on the load without any assistance from anyone else. After the load is attached to the hook, the load may be moved from the higher surface by applying the brake and pulling back on the handles of the manual manipulation point to pivot the boom on the wheels. Once the weight of the load is generally above the wheels, the user is able to release the brake and move the lifting device upon the wheels.

It will be understood that applying the brake both stops the wheels from rotating with respect to the main body and pivots the boom only in the vertical central longitudinal plane via the wheels. This provides better control to manage the counterweight required at the manipulation point which is particularly important when the load is at height and the boom is pivoted forward so the offset distance from the load to the wheels is large.

It will be understood that for loads of a lighter weight, the brake may not be required in order to lift the load up off the higher surface.

The load may be lowered by first reducing the height of the boom relative to the wheels by reducing the extension of the electric actuator, then pivoting the boom via the wheels so that the load doesn't come down on top of the wheels and interfere with them. It will be understood that for heavyweights it may be required for the user to apply the brake to both stop the wheels from rotating with respect to the main body and pivot the boom only in the vertical central longitudinal plane via the wheels to safely place the load on the lower surface.

It will be understood that a load may also be moved between two surfaces that are substantially the same height where a combination of controlling the extension of the electric actuator, moving the lifting device upon the wheels and applying the brakes to pivot the lifting device upon the wheels enables a user to manipulate the positioning of the boom to pick up and drop off the load in the correct position.

Figure 4:
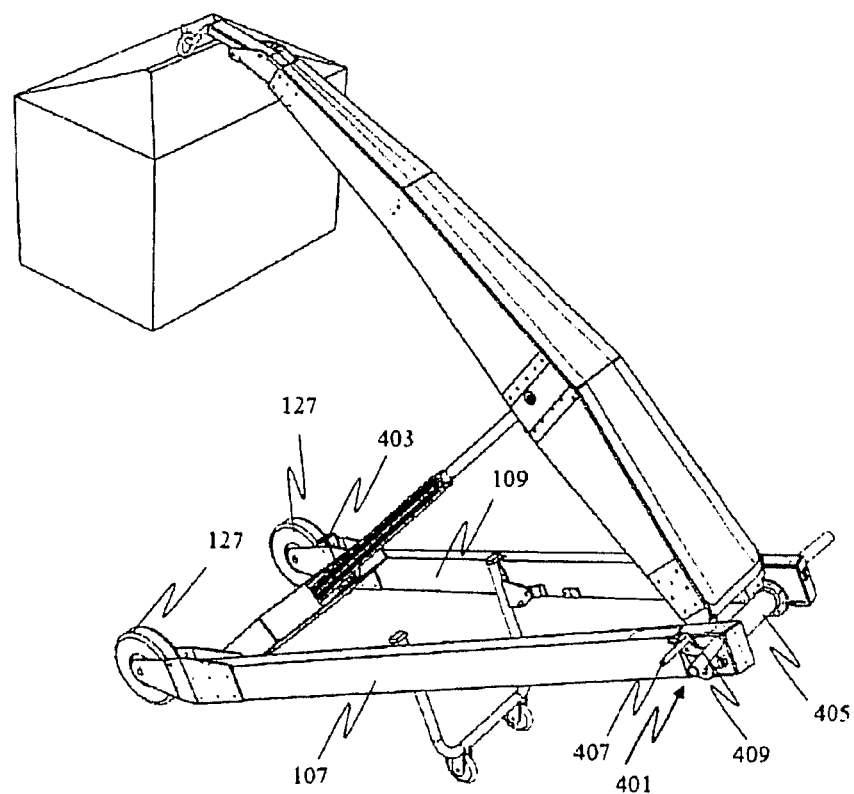
FIG. 4 shows a view of a lifting device with brake controls according to an embodiment of the present invention.
Figure 5:
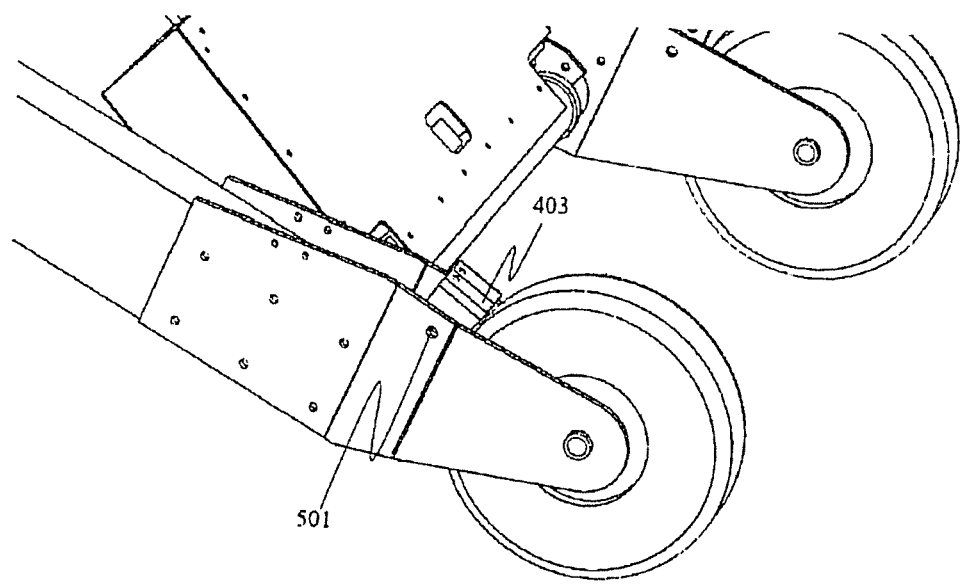
FIG. 5 shows a view of the brake system according to an embodiment of the present invention.

Referring to FIGS. 4 and 5 a view of a lifting device with brake controls 401 for operating a brake block 403 shown. Although only a single brake is shown in FIGS. 4 and 5, it will be understood that a respective brake block can be provided for both wheels 127. Brake block 403 is pivoted about an axis through brake pivot point 501.

The manually operated brake controls control the mode of operation of the brakes. The brakes can be engaged by applying force on a brake lever 407 to bring the brake lever towards the handle 409. The brake lever 407 latches into position once it has reached its end position to engage the brakes 403 against the wheels 127 for stopping the wheels 107 from rotating with respect to the longitudinal members (107 and 109). Further details of the braking mechanism are described below with respect to FIGS. 11A to 11O, as well as FIGS. 36 and 37.

Figure 6:
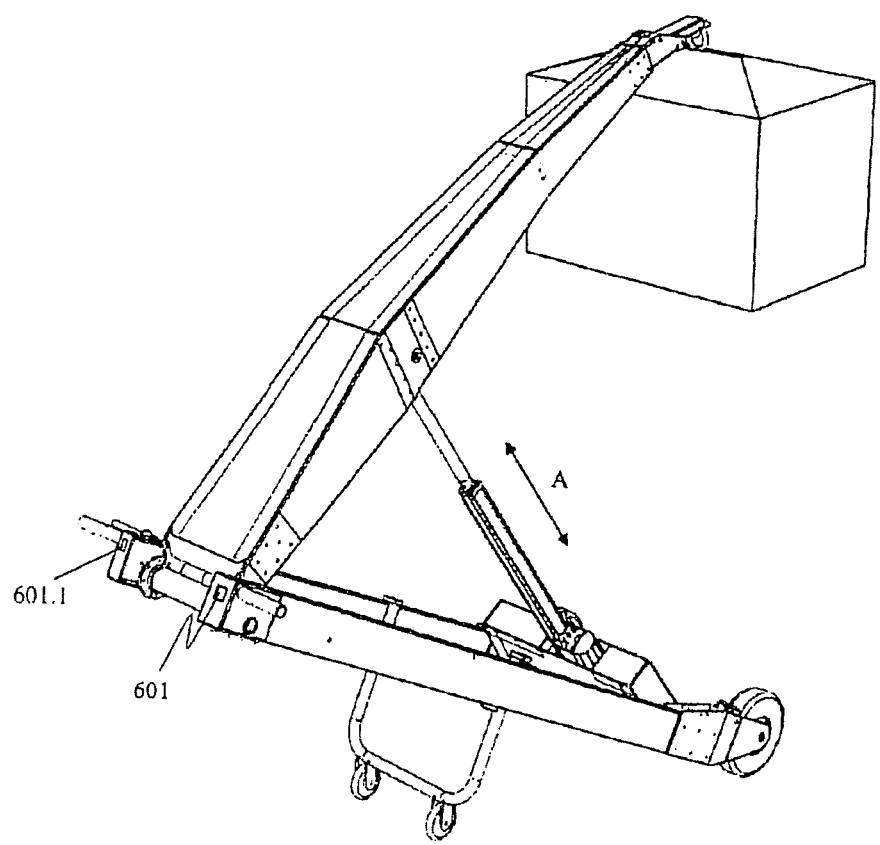
FIG. 6 shows a view of a lifting device with actuator controls according to an embodiment of the present invention.

FIG. 6 shows a view of the lifting device with actuator controls 601. According to this embodiment, the electric actuator is operated by a rocker switch button forming the actuator controls. Upon pressing upwards on the button, the electric actuator extension ('A') is increased and upon pressing downwards on the button, the electric actuator extension ('A') is reduced.

Figure 7:
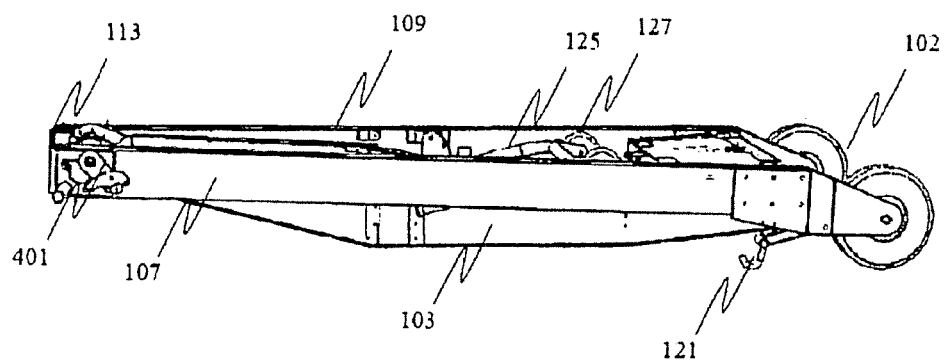
FIG. 7 shows a view of a lifting device arranged in a collapsed orientation for storage according to an embodiment of the present invention.

FIG. 7 shows a view of the lifting device arranged in a collapsed orientation for storage. By controlling the electric actuator controls to reduce the extension of the electric actuator to an absolute minimum, the boom locate itself in between the two longitudinal members such that it is substantially in line with those longitudinal members. By pivoting the support member into a position between the longitudinal members, the entire lifting device is substantially flat packed to enable compact storage. Further, the hook 121 may be pivoted relative to the boom to enable safe storage.

Figure 8:
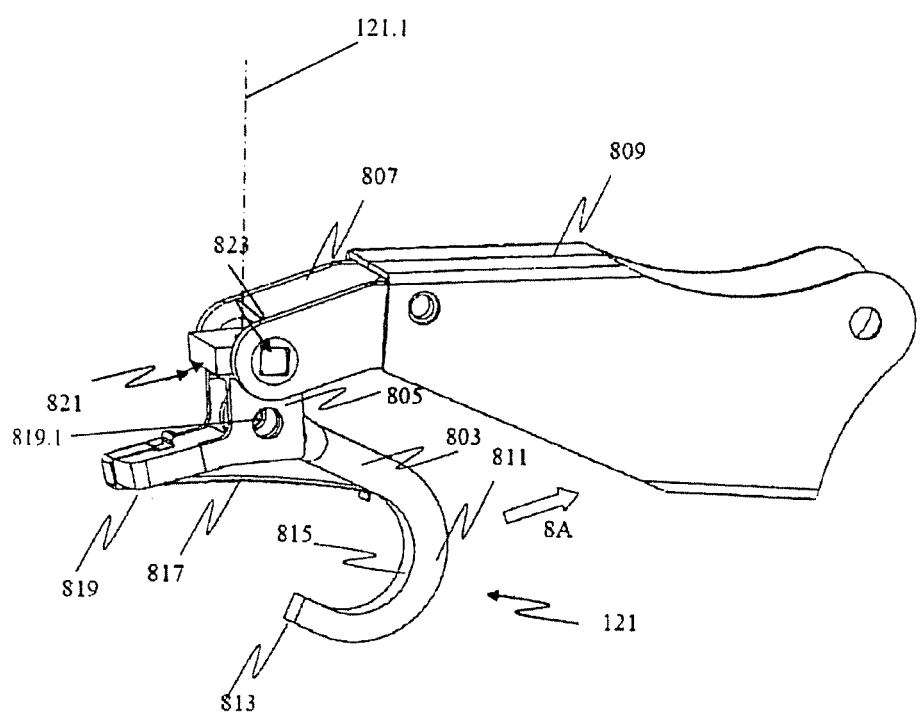
FIG. 8 shows a view of a hook mechanism in one orientation according to an embodiment of the present invention.

FIG. 8 shows a view of the hook mechanism in one orientation where a load is not placed on the hook. The hook 121 has a straight portion 803 pivotally connected at one end to an intermediate biasing portion 805 to enable the hook to pivot with respect to the intermediate biasing portion 805. The other end of the straight portion 803 joins to a curved portion 811, which forms the load engagement means for engaging the eyelet on the load. A load bearing surface 815 is provided on the internal surface of the curved portion 811. A biasing means 817, in the form of a spring or any other suitable biasing element, is attached at one end to an extension portion 819 of the intermediate biasing portion 805. The second end of the biasing means 817 is placed against a surface of the straight portion 803 of the hook, where the surface of the straight portion extends from the internal surface of the curved portion 811. The extension portion 819 is a counterweight for the hook 121, such that the counterweight 819 will tend to move downwardly (anti clockwise in FIG. 8) relative to or around the pivot 819.1 (a bolt would be present in the apertures visible). By moving or being gravity biased in a downward motion, then this will counter balance the weight of the hook 121, via the spring 817, to push the hook 121 to a ready to use position.

It will be understood that the biasing means may be any suitable biasing means, such as a spring (helical or otherwise), tensioned piece of metal or plastic etc. Further, it will be understood that the biasing means may be positioned on the reverse side of the hook to bias the hook in the same manner.

The intermediate biasing portion 805 is connected to a first portion 807 of a connector element 809 which is attached to the end of the boom. The intermediate biasing portion is connected to the first portion 807 by way of a rotatable connector 821 (which allows for rotation about horizontal axis 823 and vertical axis 121.1 in FIG. 30) to enable the intermediate biasing portion 805 (and so the hook) to rotate with respect to the boom as well as by way of a pivotal connection 823 to enable the intermediate biasing portion 805 (and so the hook) to have pivotal movement relative to the first portion 807 of the connector element and thus always hangs in the same orientation no matter what the angle of the boom is.

The biasing element provides a biasing force to move the hook in the general direction of the arrow 8A. That is, the hook is spring biased back away from the extension portion 819 of the intermediate biasing portion towards the connector element 809 in this particular position shown in FIG. 8. It will be understood that the connector 821 is also able to rotate the portion 805 about a vertical axis 121.1 (as is visible in FIG. 30).

Figure 9:
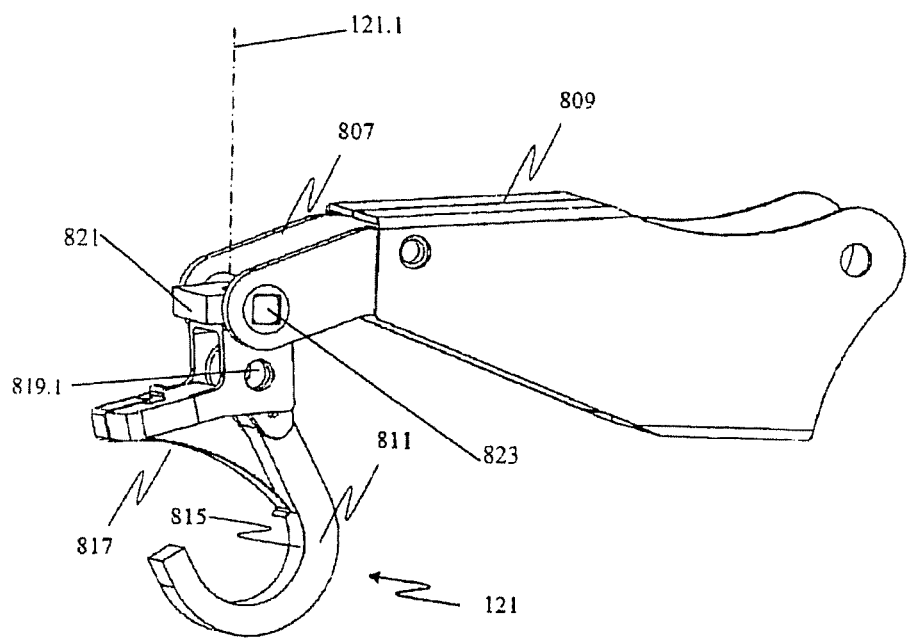
FIG. 9 shows a view of a hook mechanism in a further orientation according to an embodiment of the present invention.

FIG. 9 shows a view of a hook mechanism in a further orientation when a load is applied to the load bearing surface 815. That is, the weight applied to the hook 121 causes the hook 121 to pivot with respect to the intermediate biasing portion 805 against the biasing element 817. When load is removed from the hook 121, the hook 121 will adopt a ready to use position as illustrated in FIG. 8.

Figure 10A:
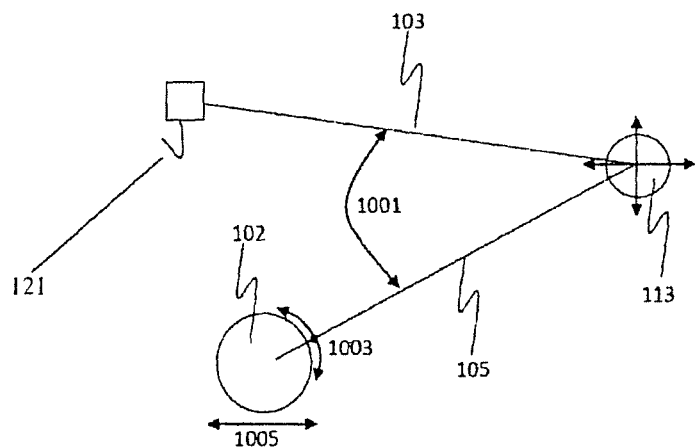
FIGS. 10A and 10B show diagrams indicating the functional relationship between various elements of the lifting device dependent upon the mode of operation of the brake according to an embodiment of the present invention.

FIG. 10A shows a diagram indicating the functional relationship between various elements of the lifting device when the brake is not engaged, i.e. the brake operating in a first mode of operation.

As the brake is not engaged, the wheels 120 may rotate in a plane parallel to a vertical central longitudinal plane (i.e. about a horizontal axis) with respect to the main body 105 as indicated by the arrow 1003. Further, the wheels 120 are free to move in the horizontal plane along the surface upon which the lifting device is located as indicated by arrow 1005 as well as being able to rotate in a plane parallel to the vertical central longitudinal plane depending upon the direction of the force applied by the user to the manual manipulation point 113.

The manual manipulation point 113 may therefore move In any direction within the horizontal and vertical central longitudinal plane.

Further, the boom 103 may be pivoted relative to the main body by increasing or decreasing the pivotable distance 1001 by operating the electric actuator.

Therefore, the hook 121 may be positioned by the user to engage a load or disengage a load.

Figure 10B:
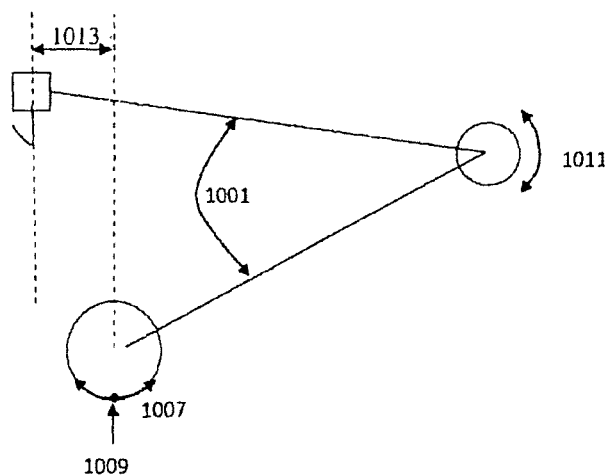

FIG. 10B shows a further diagram indicating the functional relationship between various elements of the lifting device when the brake is engaged, i.e. the brake is operating in a second mode of operation.

According to this mode of operation, the wheels 102 are unable to rotate with respect to the main body 105, i.e. the wheels are fixed with respect to the main body, and so when a user applies a force to the manual manipulation point 113 is indicated by the arrow 1011 the lifting device pivots about a pivoting point 1009 as indicated by the arrow 1007. It will be understood that the wheels 102 still roll across the ground a small distance as the lifting device pivots about the wheels.

By increasing the distance 1001 between the boom and main body through adjusting the extension of the electric actuator, and by manually manipulating the machine at 113 according to the arrow 1011 the offset distance between the load and the wheels is adjusted as indicated by arrow 1013. This enables the reach to be easily adjusted by the single user to engage and disengage a load from the hook 121.

It will be understood that for the lifting device to be in equilibrium the moment about point 1009 created by the load weight and the offset distance 1013 must be counterbalanced by the weight of the machine and the force applied by the users hands at 113. It will be understood that essentially the brake helps stabilise and manage situations where the load is at height and at large offset distances.

Figure 11A:
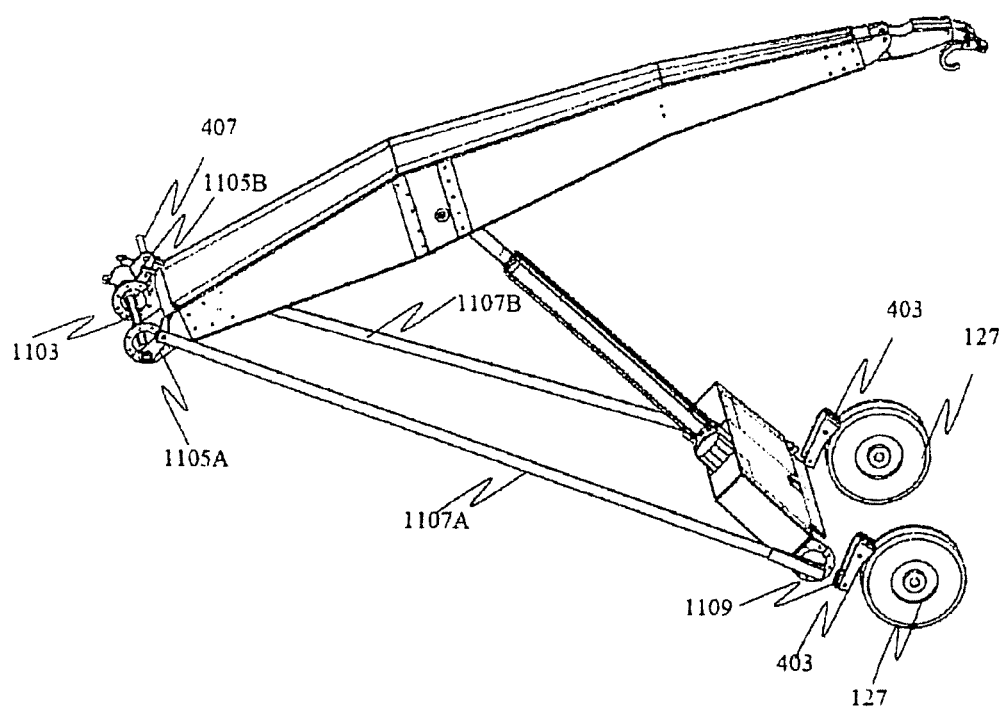
FIGS. 11A to 11C show details of the braking system according to an embodiment of the present invention.
Figure 11B:
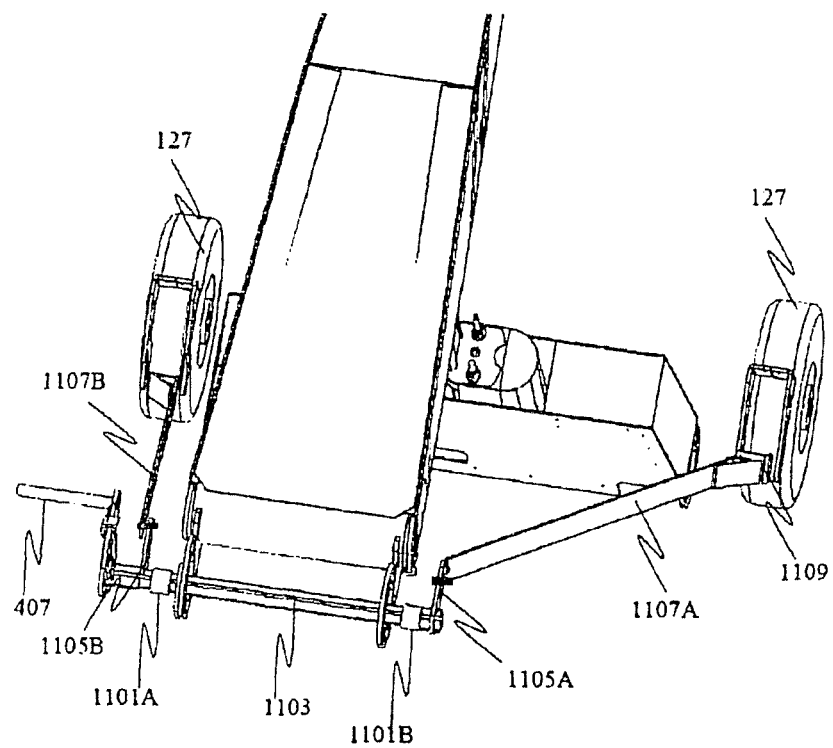
Figure 11C:
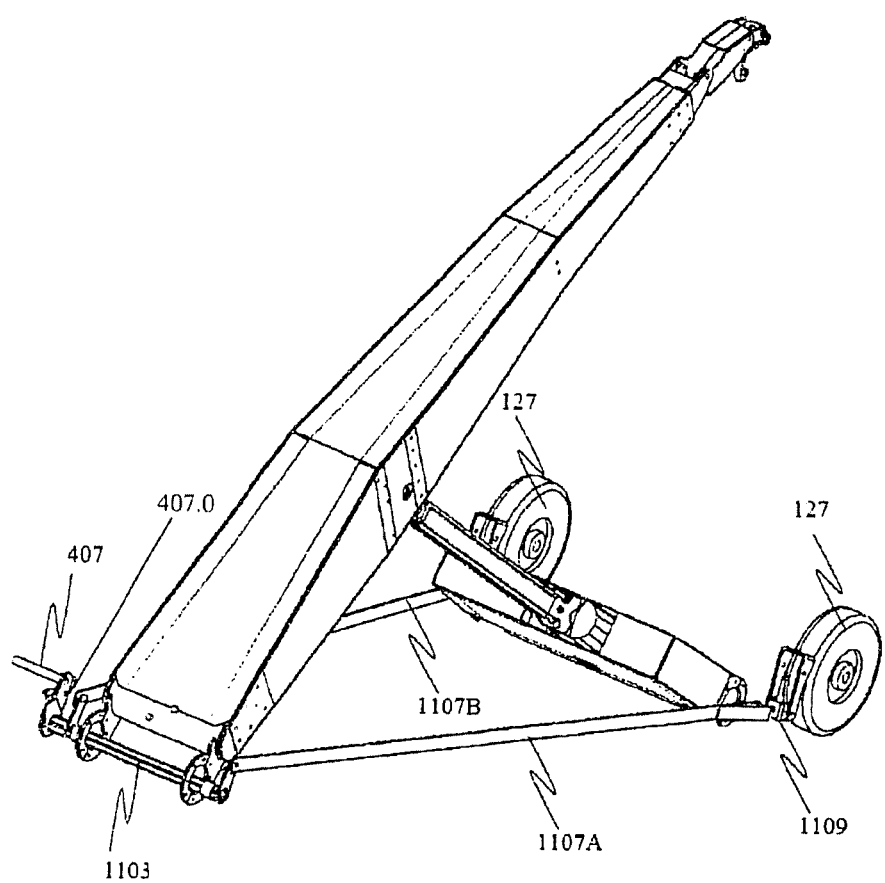

Referring to FIGS. 11A to 11C further details of the braking system as described above are shown. The brake lever 407 is in mechanical communication with rotating elements levers 1105A and 1105B via a connecting shaft 1103. The shaft 1103 is supported rotatably within bush elements (1101A and 1101B). Element levers 1105A and 1105B are pivotally connected to a respective brake driveshaft (1107A and 1107B). Upon actuating the brake lever 407, both the levers 1105A and 1105B rotate in a counter clockwise direction as viewed from FIG. 11A. The levers (1105A and 1105B) are fixedly attached to the shaft 1103. The brake drive shafts (1107A and 1107B) are therefore forced away from the wheels 127 to force the brake pads 1109 to pivot at brake pivot point 501 (see FIG. 5) and cause the top section of the brake 403 to press against the wheels 127 and so stop the wheels from rotating with respect to the main body. This therefore places the brakes in the second mode of operation.

Figure 36:
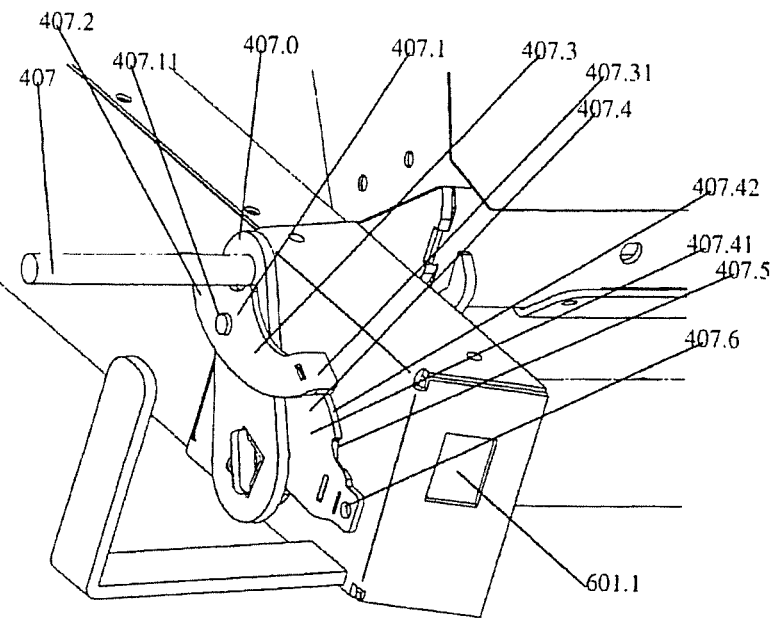
FIG. 36 illustrates a perspective view of a brake lever and a locking mechanism for the brake in an unlocked condition with handle 409 removed for ease of illustration.
Figure 37:
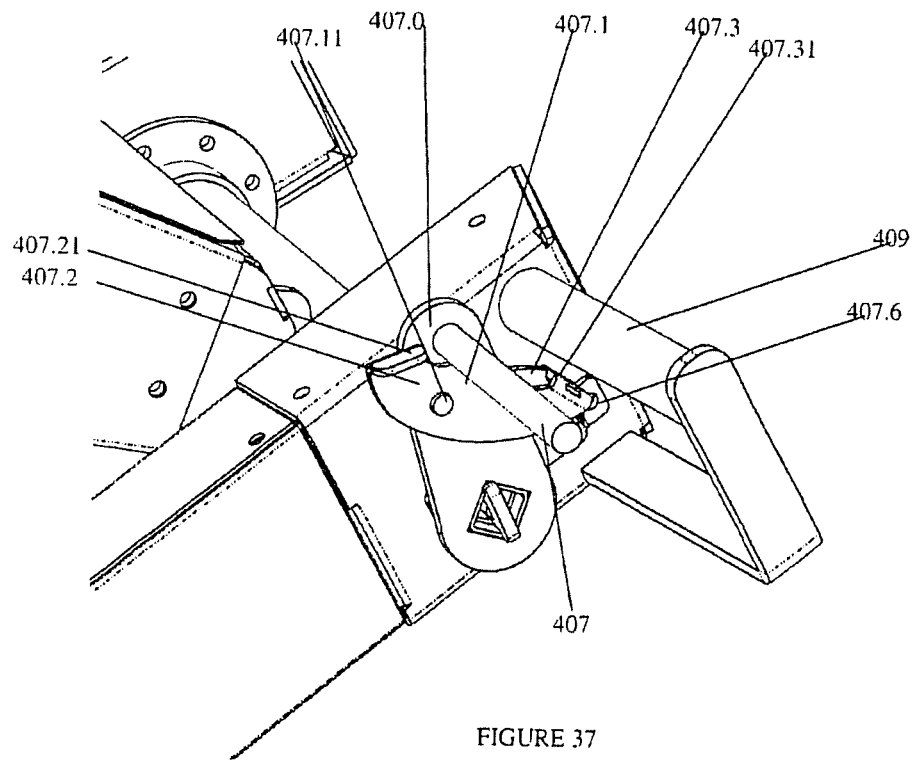
FIG. 37 illustrates a perspective view of the apparatus of FIG. 36, with the locking mechanism in a locked condition.

A releasable catch system is illustrated in FIGS. 36 and 37 is also provided to engage the brake lever 407 in a locked position or condition when the brakes are activated, with the releasable catch being released to disengage the brake lever 407 to thus release the brakes.

As illustrated in FIG. 36, the brake lever 407.0, which is attached to brake handle 407, has pivotally attached to it a releasable catch lever 407.1, by means of a pivot mount 407.11. The catch lever 407.1 has a release end 407.2 and a catch end 407.3. As the catch end 407.3 of the catch lever 407.1, namely that portion to the rear of the pivot 407.11, has greater mass than the release end 407.2, being that portion forward of the pivot 407.11, gravity will bias the catch end 407.3 to maintain contact with a catch plate 407.4. The catch plate 407.4 is securely mounted to the body of the lift device by means of flange 407.6 which has an aperture therein to allow the plate 407.4 to be riveted or bolted to the body of the lift device. The flange 407.6 is inset from the main body portion 407.41 of the catch plate 407.4. This will ensure that the upper edge 407.42 is parallel to the catch 407.3 even though the main body is at a slight angle outwards towards the wheels, and ensures that the catch lever flange 407.31, which is at right angles to the main body of the catch lever 407.1, will ride over the upper edge 407.42, without encountering any interference.

The upper edge 407.42 terminates in a catch recess 407.5, such that when the brake lever 407 is moved sufficiently to lock the wheels, the catch lever flange 407.31 will ride over the upper edge 407.42, and be positioned in the recess 407.5, and this will lock the brakes at the on condition, as is illustrated in FIG. 37.

To release the brakes, the release end 407.2 is rotated anti-clockwise by the operator pushing their finger (while holding the handle 409) against the release pad 407.21, which disengages the catch lever flange 407.31 from the recess 407.5 and the brakes move back to the disengaged position or condition, under the bias Therefore a lifting device is provided that is suitable for use by one person with improved pick and place functionality and with light weight construction and handling.

Figure 12:
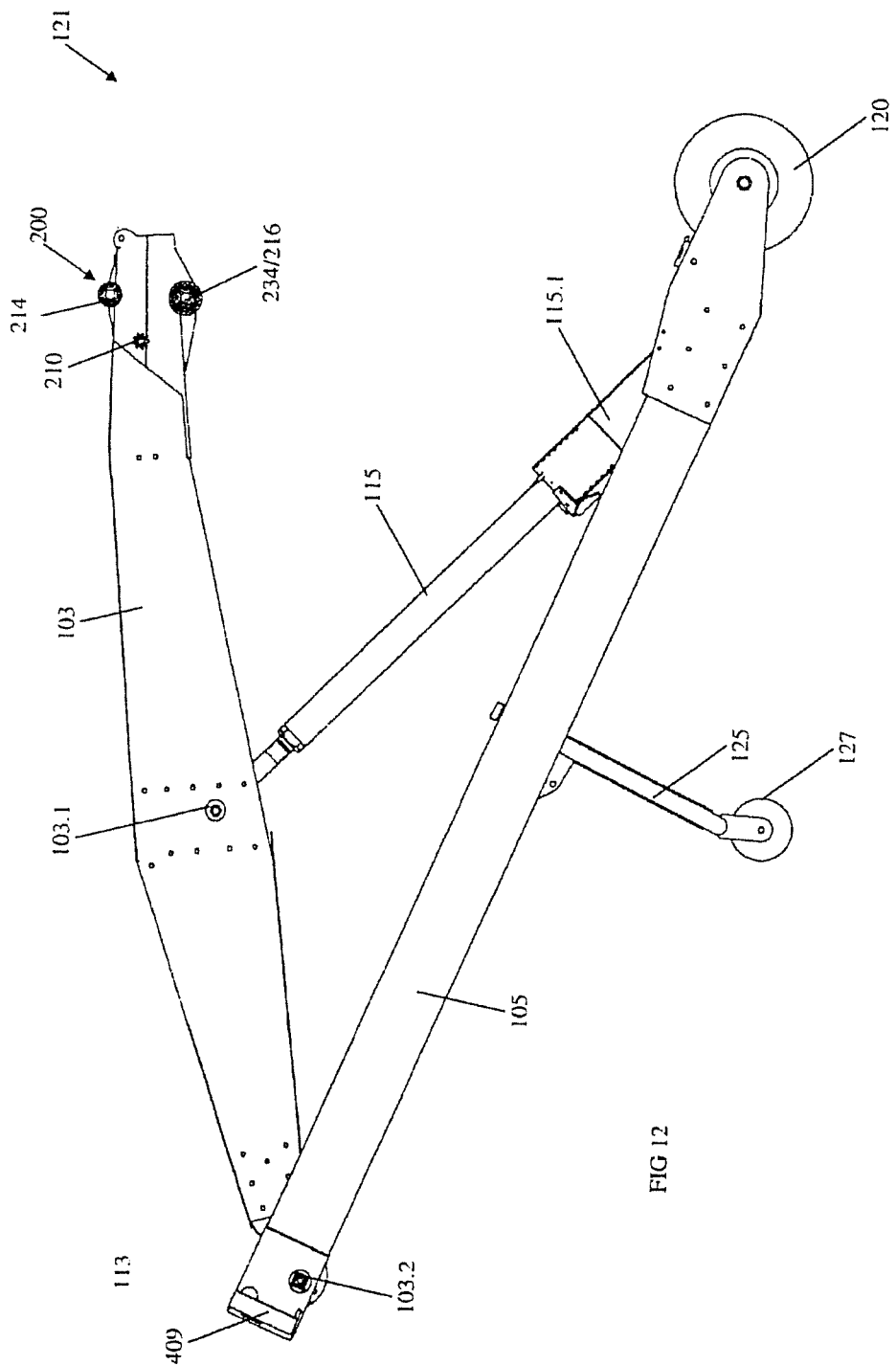
FIG. 12 illustrates a side view of another lifting device.

Illustrated in FIG. 12 is another embodiment of a lifting device similar to that of previous figures. The embodiment of FIG. 12 differs in that the hook system 121 has a different construction to that previously illustrated and the addition of an implement mounting system 200 both of which will be described in more detail below.

As described previously, the device of FIG. 12 has an electric actuator 115 which is pivotally connected to the hoist arm or boom 103 at pivot point 103.1 and to the main body 105 at a pivot point on the main body 105 which holds the pivot mount 115.2 which is best illustrated in FIGS. 5 and 14. Mounted to the pivot bar 115.2 is a monocoque box-like structure 115.1, which in FIG. 35 is illustrated with the front panel removed, which secures the base 115.4 of the actuator 115 and provides a cavity in which electric storage batteries 115.3 and control systems relating to those batteries 115.3 and other control features of the device are located.

Figure 35:
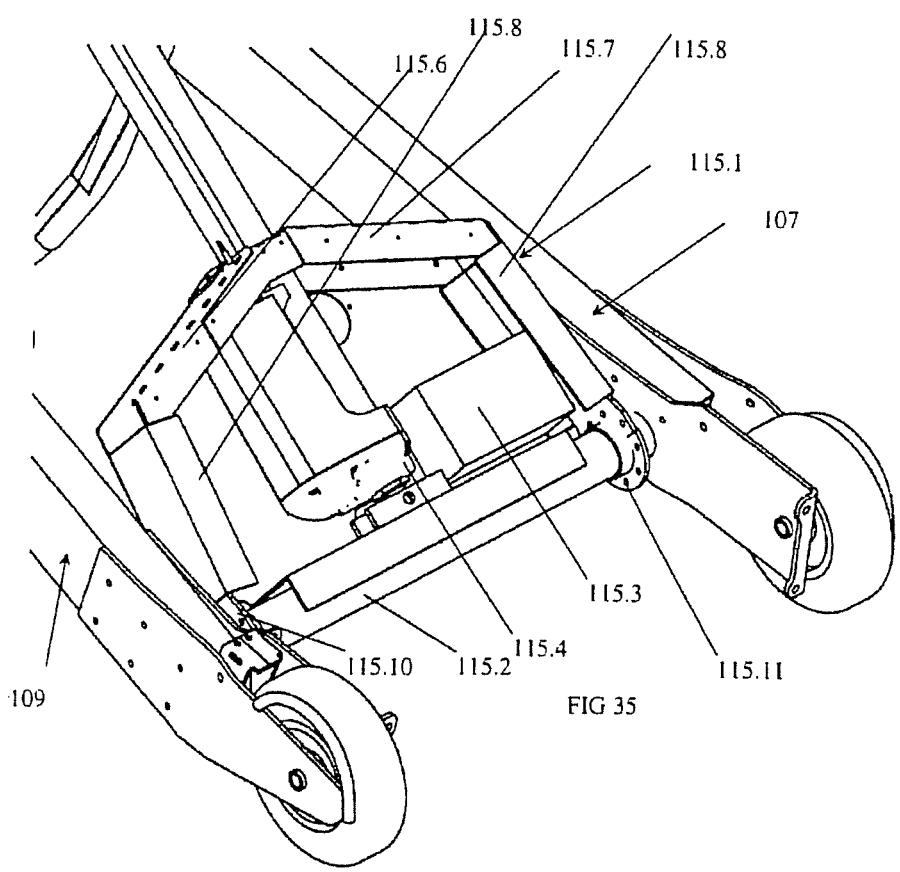
FIG. 35 illustrates a perspective view of the actuator base construction and receptacle to house the battery and control systems therefore which can include a recharging socket or plug.

As best seen from FIG. 35, the monocoque box like structure 115.1 is constructed from frame members 115.6 and 115.7 which connect at their inboard ends to the actuator body 115. Extending downwardly away from the outboard ends of member 115.6 and 115.7 are members 115.8 and 115.9 respectively which are rotatably mounted to the pivot bar 115.2 by flanges 115.10 and 115.11 which have apertures and bearings such as journal or roller bearings associated therewith. The pivot bar 115.2 is rigidly connected to the two outer frame members 107 and 109 as a rigid connection assist to provide a relatively rigid and strong main body 105. The members 115.6,115.8 and 115.7,115.9 provide a yoke formation which transfers the compressive and tensile forces which result from the extension and contraction of the actuator 115, to respectively the left and right sides of the pivot bar 115.2. near to the inboard sides of frame members 107 and 109, as this will create less tendency to bend the pivot 115.2, so that the pivot is resisting such tensile and compressive forces by means of its shear strength.

By placing the pivot bar 115.2 near to the wheels 120 results in the weight of the batteries in the structure 115.1 being leveraged so as to provide a minimum adverse effect to the operator utilising the device via the handles 409.

In the lifting device the main body 105 and the load it carries, by virtue of the position of the wheels 120 (the fulcrum) and the centre of gravity of the combined load and device forms a first class lever system when the centre of gravity of the load is located on the side of the wheels' axles which is opposite to the side of the handle 409. The operator pivots the main body 105, which may occur under two conditions: with the transport means 102 in a braked condition (in which case the transport means point of contact with the ground is the pivot point or fulcrum); or with the transport means 102 in an unbraked condition (in which case an axis of rotation of the transport means will be a pivot point or fulcrum); so that the centre of gravity of the combined device and load sits on, or close to, a vertical line through the pivot point or fulcrum (see FIG. 10B where distance 1013 would be equal to zero). In such cases the system is neither a first or second class lever system. Further rotation of main body 105 in a direction which places the centre of gravity of the load between the fulcrum and the handles 409, will result in a second class lever system. This means that an operator, at their choice, is able to translate the load on the lifting device relative to the ground and the transport means, to select the type of lever system used. Thus for most load weights and substantially all load carrying positions of the boom 103 relative to main body 105, arcuate movement of said main body 105 around the wheels 120 allows an operator to transform the lifting device in one of the following manners: a first class lever system to a second class lever system; a second class lever system to a first class lever system; a first class lever system to the centre of gravity of the combined load and device being over the device fulcrum or wheels; a second class lever system to the centre of gravity of the combined load and device being over the device fulcrum or wheels.

Whereas with respect to the main body 105, the boom 103 because of the location of its pivoted mounting to the main body at pivot 103.2 and application of effort via pivot 103.1 and the load being at the locations of the implement mount 200 or hook system 121, the boom 103 when considered by itself generally describes a third class lever system.

It will also be noted from previous paragraphs and illustrations that the pivot bar 115.2 being located so as to be generally rearward of the rear most circumference periphery point of the wheels 120 (that is in the direction along the main body 105) ensures that, as best illustrated in FIG. 13, that a space is provided between those wheels indicated by the region 120.1. The space 120.1 allows the lifting device to manoeuvre close to and or position loads between the wheels 120 or in this space 120.1 if the load is sufficiently small and if so desired.

The space 120.1 between the wheels is also particularly useful for loading onto vehicles, particularly flat bed loading platforms, as the space 120.1 allows the lifting device to pass bollard or other obstruction which might be present.

The space 120.1 is produced by the location of the pivot bar 115.2. The space 120.1 is a preferment, because as will be described later a transport or translation means such as one or more rollers could be used to occupy the space 120.1. Further, depending upon the geometry desired, a longer actuator might be used and the pivot bar 115.2 can instead be located at the wheels' rotation axis, and provide stub axles to mount the wheels. Such arrangements where no space 120.1 is provided are to some extent not of lesser versatility, in that the lifting device has a considerable horizontal reach for engaging or disengaging a load positioned forward of the wheels whether the space 120.1 is provided or not.

The rotatable support 102 or transport means has two wheels 120. Each wheel has its own rotational axis which is generally horizontal and these respective axis are essentially co-linear. This arrangement contributes to the manoeuvrability of the lifting device. Whilst the gap 120.1 and separate wheels 120 give a high degree of manoeuvrability to the device, the transport means 120 could be replaced for example by an elongated roller system or a rotating track system or the like. Whilst it is preferred that the wheels simply roll, i.e. they are not driven, it is envisaged that powered wheels, tracks or rollers could also be provided. It will be understood that the transport means a single roller, or more than two wheels or two or more rollers; an elongated endless track device; a triangular shaped endless track device, as is illustrated and described with respect to FIGS. 43 to 46 below.

Whilst the previous embodiments utilise electric power, such as for the electric actuator 115, it is envisaged that the device could also be powered by other means, such as, by compressed air with attached hoses, hydraulic or pneumatic mechanisms which may or may not include small motor units which could be powered by internal combustion engines so as to produce a hydraulic pressure to provide the motored power required for lifting, etc. Further a manual winch, such as those with ratchet type mechanisms could be used as the motive power source, if it were desired to provide a more basic system than that illustrated or envisaged.

As illustrated in FIGS. 13 to 16, the device 101 can have an implement mounting system 200 which allows for the attachment of an implement 202, such as in this case lifting tynes which serve a single purpose, or alternatively the implement mounting system 200 can be such that a variety of implements may be attached via the mounting system. In addition to such things as forklift tynes as illustrated, other implements such as bale tynes or pins, barrel grabs, container supports, lifting platforms or other generally flat surfaces, an earth moving bucket, a ground scraping tool, jackhammers, brick or block lifters, power tools, suction tools, suction devices to lift concrete or masonry blocks, suction devices for handling glass panels or even other auxiliary power units, for example, a grab system which utilises the power, of the device 101 for its motive power can be attached via the implement mount system 200.

As best seen in FIG. 28, the implement mount system 200 has a drive pinion gear 210 mounted in the side of the boom 103 which is driven by an electric motor 212 (seen in FIG. 18) and externally mounted upper left and right rollers 214 and internally mounted two lower rollers on the left and right 216 as seen in FIG. 22.

The motor 212 preferably drives the drive pinion 210 by means of a worm gear arrangement (not illustrated), so that forces applied by the implement to the pinion 210, will not result in rotation of pinion 210. That is, unless the motor 212 is energised, no rotation of pinion 210 will occur, thereby providing a quasi-lock of the pinion 210 when the motor is not energised.

The rollers 214 and 216 are adapted to be received in and travel inside of respective arcuate tracks 220 which allows the tracks to be translated relative to the rollers 214 and 216 respectively (and this boom 103). As is best seen in FIGS. 20 and 25 and 26, the roller bearings 214 and 216 sit within a track 220 which is fabricated from an arcuate plate 222 to which is welded an inner square hollow section 224 and an outer square hollow section 226. This provides a relatively strong curved beam arrangement to which a series of gear plates 228, as best seen in FIG. 20, are secured. The gear plates 228 provide a rearward set of gear teeth 230 which will engage the drive pinion 210. If desired, and as is preferred, as illustrated in FIGS. 20 and 26 the gear plates 228 also have a series of teeth 232 on their forward peripheries, so that they can engage a geared tooth 234 which is secured to a shaft 236 to prevent relative rotation between the gears 234. This is achieved by means of the shaft 236 having flat areas thereon for mounting the gears 234, as is best seen in FIG. 20 & FIG. 26. The gears 234 on respective ends of the shaft 236 as best illustrated in FIG. 26, have their teeth aligned and by virtue of having matching flat surfaces on the shaft 236 are prevented from relative rotation and will engage the forward gear teeth 232 on respective tracks 220, thus helping to transfer any skewed loading on the implement 202 to be generally evenly borne by the tracks 220, so that the device can operative relatively effectively, even under a skewed loading.

Figure 17:
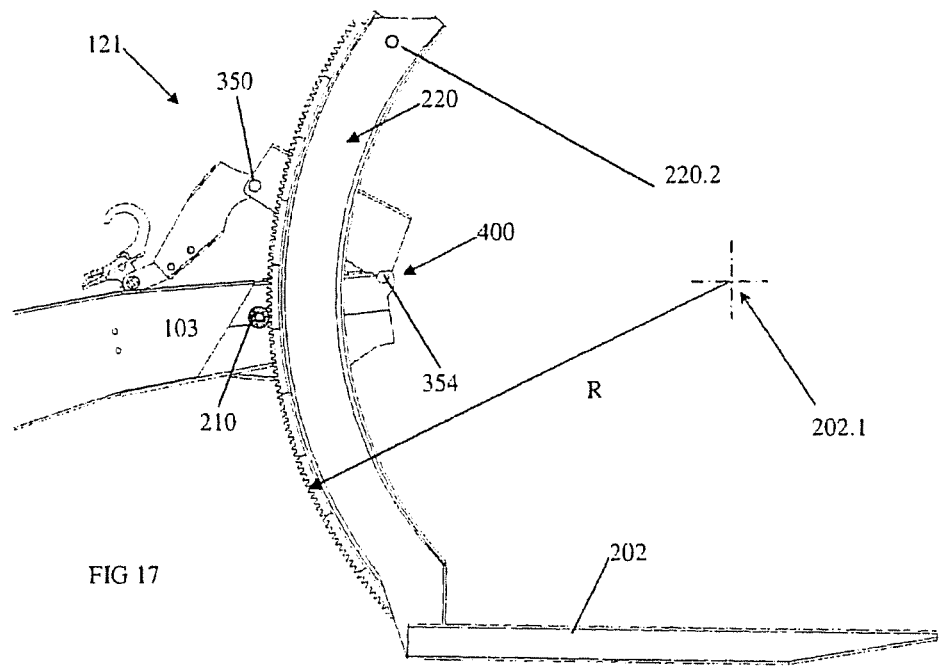
FIG. 17 is a close up view of a portion of the apparatus of FIG. 13 showing hook means in a folded back position.
Figure 18:
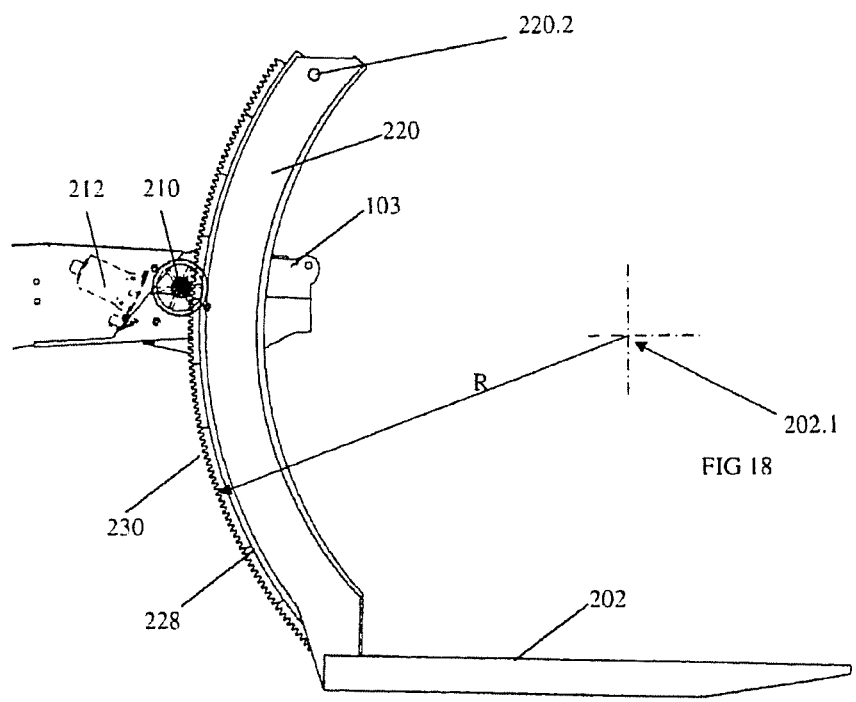
FIG. 18 is a close up view of another portion showing the motor and other components shown in hidden view and with hook means removed.

This implement mounting system 200 maintains a similar load centre to the hook implement which is roughly vertically in line with the virtual center of rotation 202.1 and also is semi automatically levelling which means the levelling motor can be small and this can be understood from the detail below. As is illustrated in FIGS. 17 and 18, the gear teeth on the gear plates 228 are on a radius R of approximately 500 mm from the virtual centre of rotation 202.1.

Whether the motor 212 is driving it or not, as long as the load center is below the virtual center of rotation 202.1 (which will normally make the implement 202 horizontal) the engagement of the pinion 210 with the teeth 230 has a relatively constant minimal engagement force because the rollers 214 and 216 will resist the sum of forces and bending moments created by loads applied to the implement 202, in particularly when the centre of the load is positioned about halfway along the fork tynes in line with the point 202.1. This is easiest to visualise by imagining that the arcuate track were full circular structures, in which case the geometry will cause the circle to rotate until such time as the centre of gravity of the load is at the bottom of the arcuate path, vertically under the theoretical centre of the circle 202.1, where it will be at an equilibrium position. This will therefore require zero reaction from gear 210 to maintain equilibrium. Pinion gear 210 only has to provide enough force to keep the load near where it already would naturally be if pinion 210 were not engaged. Accordingly not much power is required by the motor 212 and the motor 212 can therefore be lightweight and relatively cheap and this is an advantage of the arrangement. Depending on the loading, the rearward circumference of the roller 214 as illustrated in FIG. 20, would prevent the rotation of the track 220 by engaging the rearward section 226, whilst the lower bearing 216 will engage the track 224. In the Figures of 25 and 26, it can be seen that the spacing between the inboard surfaces of the sections 224 and 226 have a dimension which is greater than that of the roller 214 in the case of FIG. 25 and the roller 216 in the FIG. 26. It will also be noted in FIGS. 25 and 26 that in FIG. 25 the roller 214 is engaging the outer section 226 and not engaging the inner section 224, whilst in FIG. 26 the roller 216 is engaging the forward section 224 but not engaging the rearward section 226. This will be the case due to load of the implement 202, and would reverse under a reverse loading.

The implement mount mechanism 200, the implement 202, and attached tracks 220 allows an operator utilising the lifting device 101, as best illustrated in FIGS. 15 and 16, to keep the implement 202 generally level during its movement from its lowest condition as illustrated in FIG. 15, to its potentially highest position as illustrated in FIG. 16. It is envisaged that this is attended to by the operator adjusting a control (such as a left side switch 601.1 as seen in FIG. 6) on the handles or closely associated therewith, which will power the motor 212 so that the pinion 210 can engage the gears 230 and thereby provide relative rotation of the track 220 and thus implement 202 relative to the boom 103. While a manual system is preferred, it is envisaged that an automatic levelling system, with ready calibration, can be utilised.

As is best illustrated in FIGS. 22, 27 and 28, the upper axle 240 is attached to two similar mounting plates 242 Each mounting plate 242 has side flanges 244 which, with the straight edges of the side plate, allow welding to the axle 240 and hold the axle rigid. The reason two mounting plates being attached to the axle 240 is to ensure that the lowermost point of the axle 240 will be in contact with the boom, as is best illustrated in FIG. 27.

The mounting plates 242 each have three elongated slots 246, which when assembled to the axle 240 is such that each one of which has its longitudinal direction being generally perpendicular to a radial line passing through the theoretical centre 248 of the shaft 240 when viewed in plan view as illustrated in FIG. 22, and indicated by the broken radial lines.

The slots 246 allows the top plate 242 by means of a bushing 250, as illustrated in FIG. 19, to be attached to the boom 103 by a nut and bolt which will not clamp the plate 242 to the boom 103, otherwise so that the plate 242 would be immovable relative to the plate 103. The only movement possible for the plate 242 to be able to move under appropriate loading, is to rotate about its theoretical centre 248 of the order of one or two degrees in the positive or negative direction when the bolts are located in the centre of the slots 246. This relatively small degree of positive or negative directional movement of the plate 242 with respect to the boom will allow the rollers 214 to move so as to take up a small degree of flex or misalignment in tracks 220 and or misalignment of loading that might be applied to the implements 202.

As is best seen in FIGS. 27 and 23, the shaft 236 is rotatably mounted by means of bearings 252 into a tubular mount 254 which is also seen in FIG. 28 as being secured or formed with part of the boom 103. The bearings 252 have their outside diameter held in counter-bored ends 254.1 of the tubular mount 254, and are used to rotatably mount the shaft 236 to the boom to ensure that the gears 234 on either end can rotate relative to the boom whilst the outer bearings 216 can rotate independently of the gears 234 and shaft 236.

The arrangement illustrated in FIGS. 28 and 22 allow the implement mount system 200 to maintain the implement generally square and not askew relative to the boom 103 and the rest of the lifting device. However, as illustrated in FIG. 21, there is illustrated another mechanism to achieve the same resistance to the tracks 220 becoming askew. In FIG. 21, by providing two pinions 212, i.e. one on either side of the boom 103 (driven by a single motor 212) and as both tracks 220 will have their respective rearward facing gears 230 engaged and as the pinions 212 are on a single shaft 212.1, which can be turned by a worm gear or such like, the left and right side tracks 220 will maintain their alignment relationship and the implement 202 will not skew under load.

As can be seen in FIG. 21, the lower bearing 216 in the embodiment of FIG. 21 does not require the gears 234 which would allow the construction of the lower roller set, such as in FIG. 27, to be much simpler, in fact being able to utilise the same roller system as for the upper rollers 214, except in this instance the plates would be secured for no movement relative to the boom unlike the upper rollers.

As illustrated in FIG. 12, the hook system 121 is shown in dotted lines, and in some of the embodiments of the device 101, such as in FIGS. 13 and 14, the hook system is removed. In contrast with this, in FIG. 17 an articulated hook system 121 has a pivotal connection 400 to the boom 103 by means of a hook and pin arrangement, as will be described in more detail below. An advantage of the readily engageable implement system 200 is that the hook system 121 can be simply rotated out of the way, then the track 220 and implement 202 installed by feeding onto the implement mount 200 then operating the implement 202 in a manner conducive to its purpose, such as a tyne or a grab or a bucket etc.

FIG. 29 illustrates in detail, the hook system 121 which provides an articulated joint 350 between the boom mount 352 and the hook connector element 809. The boom mount 352 has a bolt 354 which will allow that portion of the bolt within the sides 356 and 358 of the boom mount end 352 to sit within and be received by a series of four hooks 360 and 362 as seen in FIG. 28. The hooks 360 are formed directly on the boom 103 while as illustrated in FIG. 19, the hooks 362 are formed of steel and fabricated or integrally formed with a mounting plate 364. The mounting plate 364 is located inside the boom 103 and the boom's upper element 103.3 as illustrated in FIG. 19 is sandwiched between the plates 364 and the plate 242 on the upper roller system. The plate 364 is secured by riveting (not shown) to the boom upper element 103.3 by means of different holes than the holes 246 on plates 242.

This construction allows the boom 103 to be manufactured from relatively lightweight material such as aluminium whilst the hooks 362 can be manufactured from steel and by means of a multipoint fixing system to the boom, can transmit the lifting load applied in cantilever fashion thereto by the hook system 121.

Also illustrated in FIG. 29, and as better seen in FIG. 31, the hook 811 is biased to the open and ready to use condition as illustrated, by a similar mechanism to that of FIGS. 8 and 9, and accordingly like parts have been like numbered. In this embodiment the counter weight 819 is free to swing in a clockwise direction around pivot rotatable connector 821 (a bolt would be present in the apertures visible in FIGS. 29, 30 and 31) and as a 2 mm spring steel clip or ring 817 is secured to both the counterweight 819 and to the rear of the hook 811, the counter weight will keep the hook 811 in an open or ready to use condition. When weight is carried by the hook 811 the spring steel clip or ring 817 will deform by compressive forces between contact points of 819 and hook 811, and once the load is removed, these compressive forces will be overcome by the spring steel to push the hook back into a open ready to use condition.

By this mechanism, the operator can choose whether like in FIG. 17 or even FIG. 31, all of the hook system 121 or a part thereof can be swung out of the way to allow the track system 220 and its attached implement 202 to be connected to the lifting device and implement 202 to carry a load which would otherwise interfere with hook system 121. Further when the unit is collapsed into its storage position as in FIG. 7, when the brakes are locked onto the wheels preventing the wheels from rotating relative the main body 105, and the lifting device propped against a wall for storage, the "double jointed" hook system or beam will ensure that the hook system and its supporting structure will not engage the wall against which the device rests, thereby ensuring that there is nothing to urge the lifting device from its equilibrium position against the wall.

Figure 34:
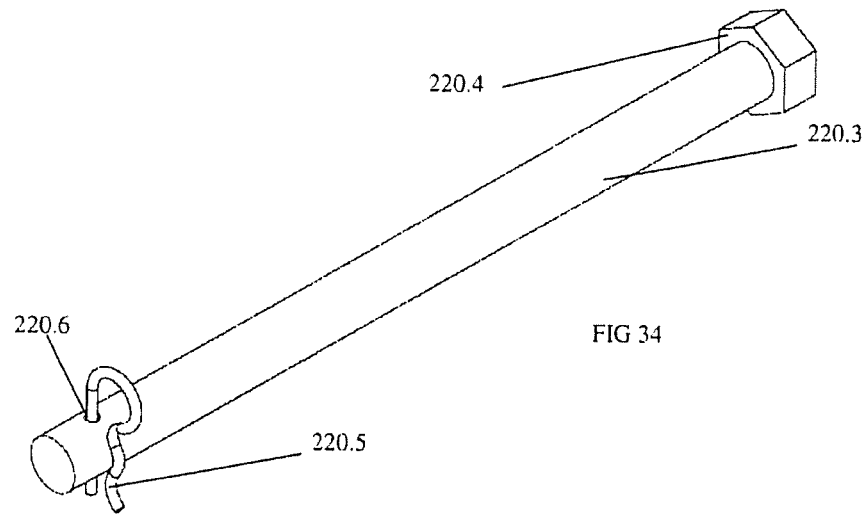
FIG. 34 illustrates a perspective view of a bolt and captured spring clip for use with the implement system.

As is first illustrated in FIG. 13, it will be noted that the two tracks 220 include apertures 220.2 so as to receive therein, a bolt 220.3 as illustrated in FIGS. 14 and 34, which when spring clip 220.5 is assembled the aperture 220.6 in the bolt 220.3, provides a bracing between them to maintain spacing between tracks 220, by preventing one track 220 from moving in an outboard direction relative to the other. This bolt 220.3 when installed also ensures that the tracks 220 cannot go past the point where they would disengage from the boom when in use.

Figure 32:
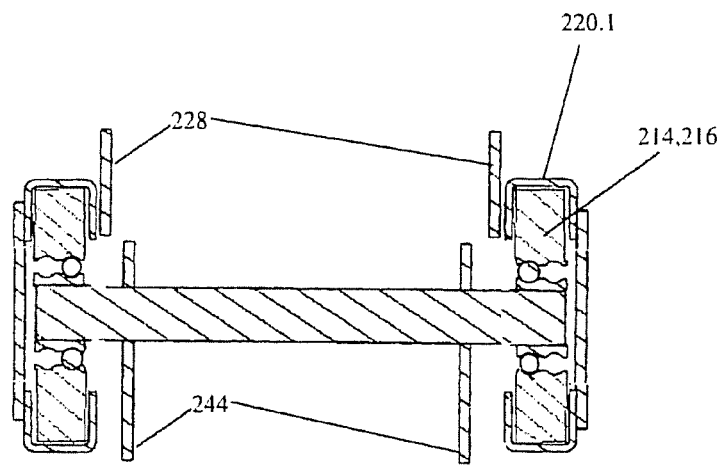
FIG. 32 illustrates a cross section of a channel based track arrangement.
Figure 33:
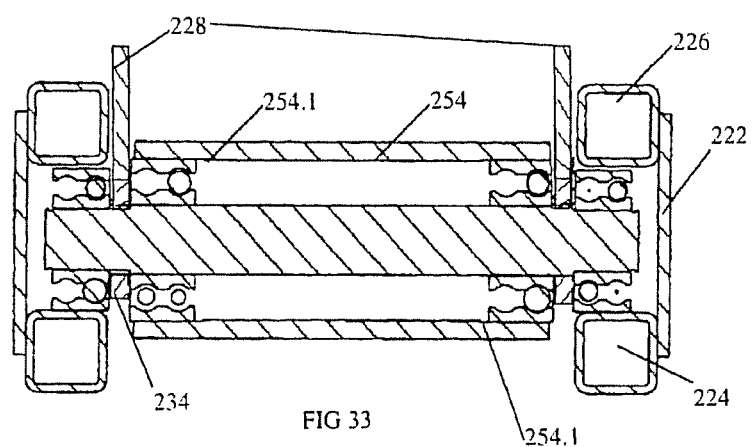
FIG. 33 illustrates a cross section of a gear plate arrangement to prevent lateral movement of the track system.

Illustrated in FIGS. 32 and 33 are two other arrangements which will prevent outboard movement of the tracks 220 relative to the boom, without relying on interaction of one track relative to the other. In FIG. 32 is illustrated a cross-section of a track 220.1 with a larger diameter bearing, for bearing 214 or 216, which assists in preventing any lateral movement of the track with respect to the boom by the rollers being confined within a channel. Alternatively such outboard movement of the track relative to the bearings could also be prevented by means of an arrangement as illustrated in FIG. 33 where the gear 234 is smaller in diameter than the bearing 216 and the gear plate 228 is of a greater width so that an inside surface of the gear plate 228 engages the inner periphery of a roller 216 in FIG. 33, thereby preventing outward relative movement of the track 220 relative to the boom 103. Such an arrangement will require the shaft 254 and bearings 252 being prevented from sliding laterally relative to the boom 103, and this can be done by a combination of shoulders and or circlips as desired.

The manoeuvrability of the lifting device 101 and the relatively high reach thereof as illustrated in FIG. 16, allows the lifting device, by means of the implement mounting system 200 and track system 220 to provide for the mounting of power tools such a concrete cutters, jackhammers and other heavy implements to be utilised with the lifting device so that concretes, ceilings and walls can be worked on in relative safety without the need for constructing, scaffolding and the like, which would otherwise be required due to the weight of the tools and forces needed to use them.

The arrangement of the implement mount 200 also readily allows active implements such as barrel grabs and the like, to be powered by auxiliary power from the lifting device 101. Such auxiliary power can be obtained by means of the channel provided by the hollow boom 103 conducting leads to the device to electrically operate (or, for that matter, pneumatically or hydraulically operate) an implement to be attached to the implement system. In this respect FIG. 40 illustrates auxiliary powered pallet tynes or lifter 700, which is can be mounted to the free end of the boom 103 of the lifting device 101 of FIG. 12. The device 700 has a boom mount 703, (such as that illustrated in FIGS. 28 and 29) which has an extension arm 704 which sits under the boom. To the boom mount 703 is pivotally attached, by pivot 706, a pair of L-shaped pallet tynes 705. The pallet tynes 705 are pivotally linked by pivot 708 to a linear actuator 702, which at its other end is also pivotally attached to the extension arm 704 by pivot 707. The actuator 702 draws power or is connected into the auxiliary circuit of the lifting device 101, so that the operator can rotate the tynes 705, by actuating buttons from the handle end of the device 101.

In FIG. 39 is a lift device similar to that of FIGS. 1 and 12, except that the device is a purpose built unit to carry a jack hammer 710, as an example. The jack hammer 710 is pivotally mounted to the boom 103 by a pivoting carriage 711 which is powered for movement by cylinder or actuator 702. For additional control the jack hammer 710 can be powered to rotate relative to the carriage 711, as illustrated in FIG. 39. In being purpose built, the load is that which is applied by the weight of the jack hammer 710 and its mounting system to the boom 103, as well as the loads and forces which act upon the jack hammer or through the jack hammer to the boom 103 and main body 105, to perform jack hammer operations. The jack hammer 710 and its ability to have its orientation adjusted relative to the boom 103 can be powered by power source of the lifting device 101, or can be powered by a separate system, whether mounted on the device 101 or separate thereto. The expression lifting device will be understood to include lifting devices which are part of such purpose built devices as those described herein, the predominant purpose of which may be to perform a function different to lifting. However, in such a device, the device lifts the weight of a component or implement and bears loads from that component or implement performing its function, such as an jack hammer, a concrete cutter, a drill, a scraper, tile remover or other non predominantly lifting related implements.

Illustrated in FIG. 38 is another embodiment of a lifting device. In FIG. 38, the device 101 is similar in geometry to the previously described devices, except that instead of linear actuator 115 being utilised to effect a power lifting of a load and a powered lowering of a load, the powered lifting is performed by means of a gas strut 115.10 which interconnects the pivot bar 115.2 and the boom 103. The gas strut 115.10 is size and selected so it will be capable of lifting, in the boom arrangement, some 120 to 140 Kgs, and will move such a weight to the length of its travel. To power lower or retract the boom 103, a winch 115.20 is mounted to the pivot 115.2 and a cable 115.21 attached to the drum of the winch and to a lower portion of the boom 103. By powering the winch 115.20, the cable 115.21 will be wound in, and the boom will compress and retract the gas strut 115.10, to power lower a load on the boom or the boom itself.

Figure 41:
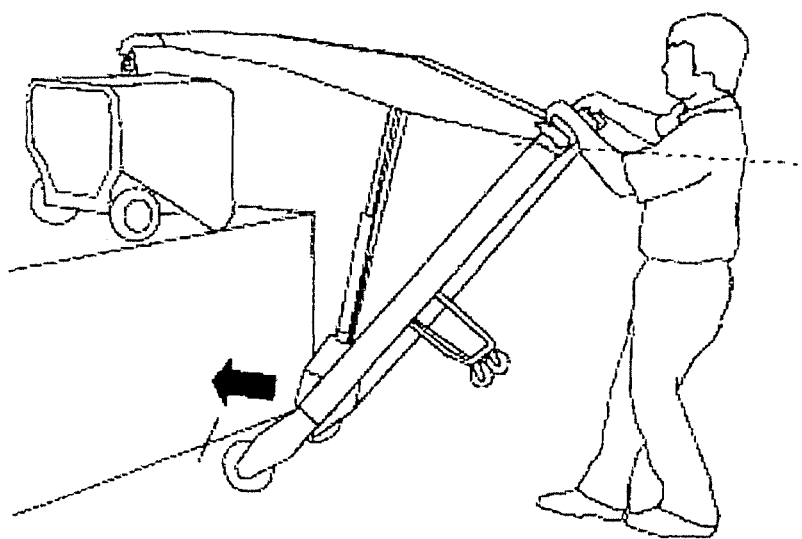
FIG. 41 illustrates the lift device of previous embodiments in use showing relationship between user hand height and reach at highest user hand position.
Figure 42:
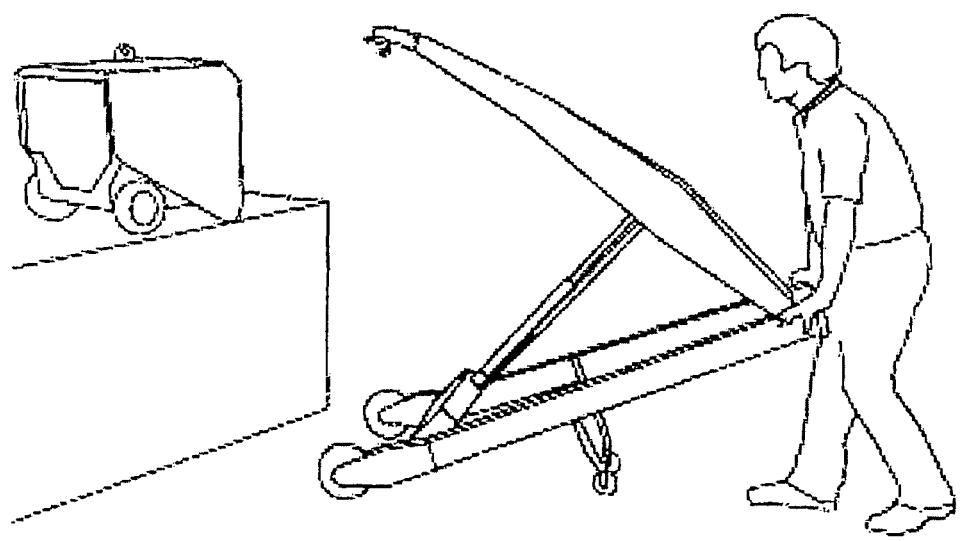
FIG. 42 illustrates the lift device of FIG. 41 in use showing relationship between user hand height and reach at lowest user hand position.

Illustrated in FIGS. 41 and 42 are indicative illustrations showing the limits of hand travel that an average operator or user may encounter during use. As can be seen in FIGS. 1 and 41, maximum horizontal reach or offset as described previously can be achieved when the handles are operated so as to be at approximately shoulder height. This is a recommended safe height maximum position for the hands. Whereas in FIG. 42 the hook of the drawing is at its farthest opposite extent where it is slightly rearward of the fulcrum and so has a rearward offset and the hands are somewhat lower than the waist height. By virtue of this range of offset available (namely a long positive offset i.e. away from the fulcrum on side opposite the operator to a negative offset i.e. between the fulcrum and the operator) it is possible to find a position slightly forward of that shown in FIG. 42 where the weight of the device 101 is balanced or counter balanced by the load on the hook. By the operator rotating the device's body to a height towards the lower end of handle heights range indicated in FIGS. 41 and 42, the operator can decrease horizontal reach to balance the combined load and device weight (and thus to minimise the force applied by the operator to achieve overall balance), while they translate the load from one location to another.

The embodiments described herein work on the following understandings. It is desirable for the weight of the device to be relatively light so it can be manually lifted into or onto a vehicle for transport to sites. The embodiment shown in FIG. 1 is approximately 40 kg in weight and is readily loaded into vehicle by one person by propping one end, lifting the other and sliding. For a lifting device it is desirable to be able to carry a load across ground or raise it to a bench height or truck bed height and for this it is desirable that the weight of that load be generally taken by the wheels and not requiring a large leverage or balancing effort from the hands. For these functions it suits to have the load centre approximately over the wheels with not much horizontal offset but for this offset to be adjustable by small adjustments of the main body around its pivot or fulcrum being the wheels. However in contrast to this, to engage or disengage a load at ground or bench height (or truck bed height) it is desirable for the load to be able to be supported substantially further forward and clear of the wheels and this range can be achieved by larger or higher pivoting movements of the main body, around its pivot or fulcrum the wheels, by the operator raising their hands. In this last described situation of larger horizontal offset, it is accepted that the load will be unbalanced but the configuration of the lifting device 101 is such that it assists to make the unbalanced nature of the system highly manageable. The manageability of this state of unbalance is greatly improved by being able to brake the wheels and by having a handle geometry which gives good leverage with respect to an unbalanced load.

This movement between the upper and lowest heights is such that the full extent of the load can be extended to be clear of, that is, in front of the wheels or transport means. Where the main body 105 is of the order of about 2 metres in length, the boom moves through approximately 65 degrees from shut flat to extension away from the main body 105. Part of this rotational movement is concerned with closing up the lifting device for storage, of the order of 20 degrees, and thus the boom rotates relative to the main body 105 about 45 degrees which is used for functional lifting.

As for the rotation of the main body 105 relative to the ground, from a location where the jockey wheels 127 are on the ground to around chest or shoulder height is approximately 25 degrees to 30 degrees of rotational movement.

In the above described embodiments the boom 103 is pivoted to the body members 107 and 109 in the vicinity of or at the rear of the device near to the handles 409. This is preferred as it renders an effective geometry for the device and its operation by a user. It will be readily understood however, that the pivotal mounting of the boom 103 to the body member 107 and 109 of the device, may advantageously be positioned at any location along the members 107 and 109, and preferably in the rear half of the device, that is, in the region from the support member 125 to the handles or manipulation end 113.

From the figures it can be seen in the embodiments of FIG. 1 and similarly constructed embodiments, that the distance from the load centre or hook 121 to the handles 409 through all load heights made possible by the device, is roughly the same as the distance from the fulcrum or axis of the wheels 120 to the handles 409. While the distances are preferred to be roughly the same, they could be at variance with each other by plus or minus 10% to 15%. It is expected that a difference of more than plus or minus 15% may make the geometry of the lifting device less advantageous than otherwise.

Figure 48:
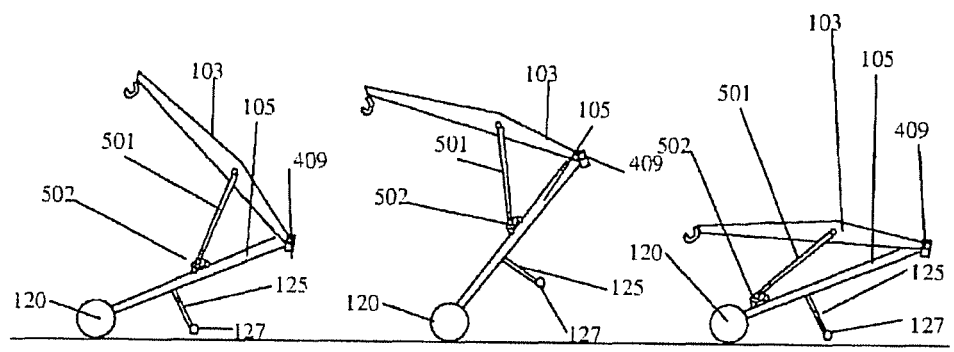
FIG. 48 illustrates a series of three schematic views of another lifting device embodiment where a boom portion is pivoted to the main body near the handles and the means for rotating the boom relative to the main body slides along the body and is of fixed length.

Illustrated in FIG. 48 is three images of an lifting device embodiment where the lifting device has a boom 103 pivotally mounted to the rear end of the main body 105 like previous embodiments, but the lifting mechanism formed by a pivoted link 501, which at one end is pivotally and slidably mounted, via a carriage 502, on and to the main body 105, so as to change the geometry of the components to thereby effect lifting and lowering power. The carriage 502 can interact with power screws, or a winch and cable in an endless loop formation, so that winding the screws or winch in one direction will move the boom up or down, while movement in the other direction will move the boom down or up.

Figure 49:
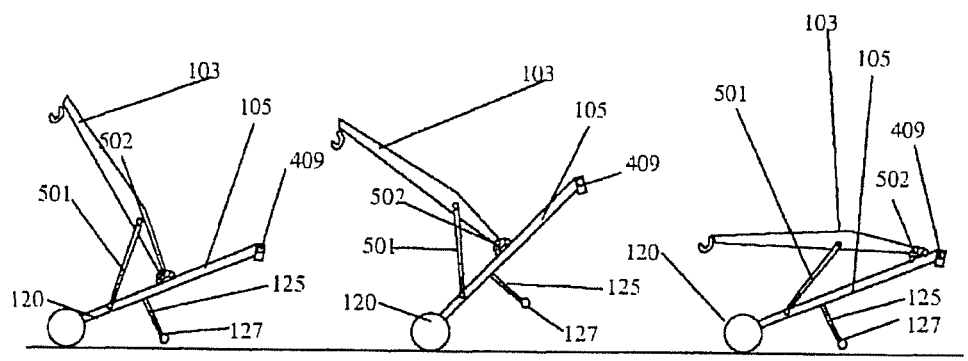
FIG. 49 illustrates a series of three schematic views of another lifting device embodiment where a boom portion is pivotally, and slidably, mounted to the body, with a fixed length link between the boom and body rotatably mounted to each, whereby sliding movement of the boom along the body provides the means to rotate the boom relative to the body.

Illustrated in FIG. 49, are three illustrations showing a lift device having a different arrangement to that described in the previous paragraphs. In FIG. 49, the boom 103 is pivotally and slidably mounted by a carriage 502, on and to the main body 105 of the 105, and has a fixed length link 501 which is pivotally connected to the main body 105 and the boom 103 respectively. By a motive power means such as threaded machine screw or the like, the carriage 502 can be made to move up and down the main body 105 so as to effect a power lift or lowering.

Figure 47:
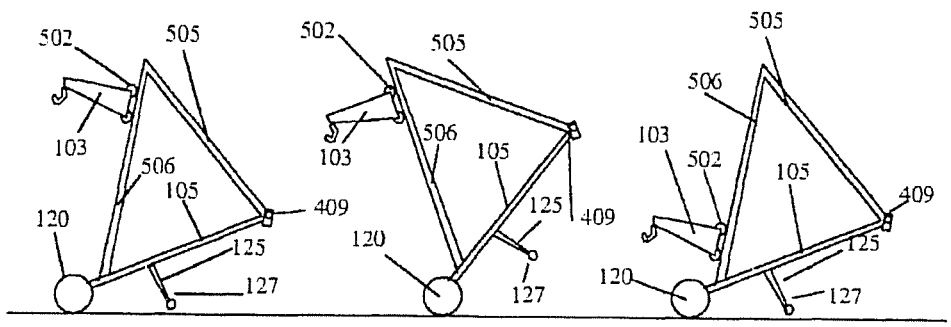
FIG. 47 illustrates a series of three schematic views of another lifting device embodiment where a mast portion is rigidly connected to the body and a boom portion traverses the mast portion.

Illustrated in FIG. 47 is yet further embodiment, where the main body 105 is in a truss arrangement with a boom portion 103, a mast 506 and a supporting mast 505. There is no pivoting movement in this embodiment between the main body 105 and the boom portion 103. It will be noted that the boom portion has carriage 502 is slidably mounted a track system on a mast 505 and to which a motive force device is connected so that the carriage 502 and thus the boom 103 can traverse the length of the mast 506.

With all the embodiments described above, the main body 105 is rotatable so as to translate a load, through an arcuate path, so as to achieve a functionally variable horizontal reach for the lifting device. This in part means that the load and those portions of the lifting device on the load side of the wheels 120 can be balanced by the weight of the lifting device on the handle side of the wheels 120, by an operator's manipulations, and when balanced or balanced to the satisfaction of the operator, the operator can then translate the load across the ground or raise it to its desired location. Another part of the functional variability of the horizontal reach of the device is that when the device is pivoted forward to a larger degree, the device will position the load well forward of the wheels 120, thereby allowing engaging or disengaging of the load on the ground in front of the wheels or at a relatively high location in front of the wheels.

For the described geometry and weight distribution, if the lifting device is in an unloaded state, the weight at the handles can be relatively light for the operator to readily and manually move the handles between hip height and chest height, as illustrated in FIGS. 41 and 42, resulting in a range of angular movement of the body relative to the ground about the fulcrum of the main wheels.

If the lifting device is in a loaded state and carrying a load equivalent to the mass of an average person, of say up to a maximum of 120 kgs to 140 kgs, and on the basis of average body height, by moving the handles between limits of hip to chest height, the main body 105 can be rotated relative to the ground for any given boom position so as to vary the load's horizontal offset from the wheels 120, which act as a fulcrum for the system so as to move through a range of offsets to provide two functional purposes. The first function is to achieve a relatively small offset which will allow balance between the countering moment of the device's own weight against the load's weight and those portions of the boom which are on the load side of the wheels. The second function is to achieve a greater positive offset distance required to position the full periphery of the load forward of and clear of the fulcrum or wheels 120, at which point then the load can be set down on the ground or a bench or other height locations without the wheels interfering with the load or the bench or other height location. Together, the first and second functions make up a functionally variable horizontal reach able to be attained by the lifting device.

The brakes which prevent the wheels 120 from rotating, when in the brakes on or locked condition, result in reduced degrees of freedom at the handles and therefore reduced degrees of freedom in the reaction force applied by the users hands required to control and balance the load carried by the device, in situations of high horizontal reach and therefore out-of-balance loading.

Figure 43:
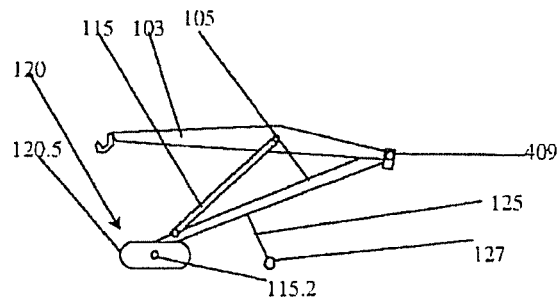
FIGS. 43 to 45 illustrate schematics of another embodiment of a lifting device, where the wheels of previous embodiments are replaced by an elongate endless loop type track as the transport mechanism.
Figure 44:
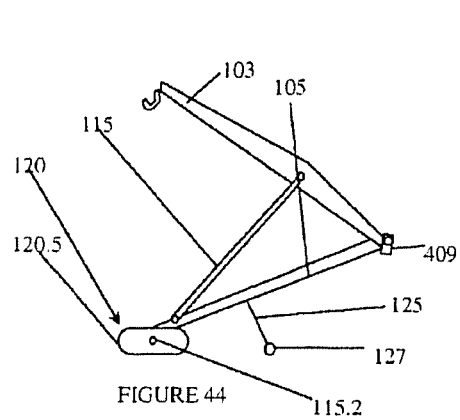
Figure 45:
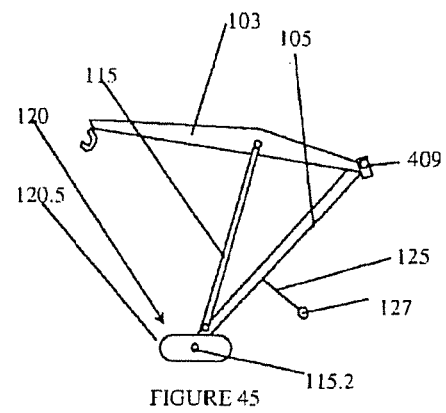
Figure 46:
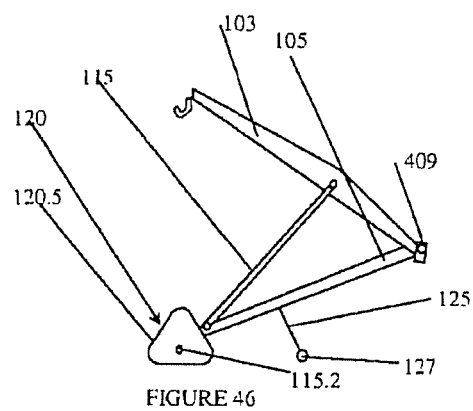
FIG. 46 illustrates a schematic of another embodiment of a lifting device where a triangular endless loop type track is the transport mechanism.

It will be noted that in the embodiments described above where there are wheels and brakes involved, that the wheels are locked to the main body, to prevent rotation relative to the ground. When the brakes are locked on, this changes the point at which pivoting occurs of the main body relative to the ground. If a braking system were employed which only prevented the wheels from rotating relative to the ground, but did not lock the wheels to the body, the axis which the main body would revolve around would be the axis of mounting to the wheels. In this respect the embodiments of FIGS. 43 to 46 work in this manner. In the embodiment of FIGS. 43 to 45, various in use geometries of a lifting device are illustrated, with the main body 105 being pivotally mounted at 115.2 to an elongated carriage or carriages 120.5 which carry a caterpillar type endless track around its outside periphery to engage the ground. In this embodiment the braking of the track, to prevent translatory movement of the transport means 120, still retains the ability of the main body 105 to rotate about the pivot 115.2. The carriage 120.5 may be motorised or may "roll" by the lifting device being pushed by an operator via the handles 409. The embodiment of FIG. 46 will function in a similar manner to that of FIGS. 43 to 45, except that a triangular carriage or carriages 120.5 is or are provided which carry a caterpillar type endless track around its outside periphery to engage the ground.

It will be understood that the embodiments of the present invention described herein are by way of example only, and that various changes and modifications may be made without departing from the scope of invention.

It will be understood that, as an alternative, the rotatable support may include a single rotating element. For example, the single rotating element may be positioned centrally along the width of the main body. The width of the rotating element may be increased to provide improved stability. According to one option, the rotating element width may be substantially the same as the width of the main body. As a further alternative, the rotatable support may include more than two rotating elements. In each case, dependent upon the mode of operation, the brake of the lifting device is operable to enable the rotating element to either rotate with respect to the main body or to remain in a fixed position with respect to the main body.

As described above, the pivot bars 405, 103.2, 115.2 are rigidly connected to the respective frame members 107 and 109 of the main body 105, so as to provide a relatively strong frame work to the main body 105. To these pivot bars are respectively rotatably mounted an end of the boom 103, or the force/stress transmission structure of the monocoque box like structure 115.1. It will be readily understood with appropriate reinforcement and strengthening this rigid and moveable relationship between the components can be reversed. For example, the pivot 103.2 and 405 can be rigidly connected to the boom 103 and rotatably connected to the members 107 and 109. In addition to this or alternatively to this, the pivot bar 115.2 can be rigidly mounted to the box 115.1 and rotatably mounted to the lower ends of the members 107 and 109. It will be further understood that is will more than likely not be as cost effective and materially efficient as the reverse construction.

In the above description relating to the implements with which the lifting device can work with, which is not a limiting list of implements, it will be understood that such implements can be provided as means which are readily attached to or detached from the lifting device. However it will also be understood that a single purpose lifting device is also within the scope of the present invention, in that for example, if the use is predominantly as a hay bale mover or pallet lifter or jack hammer mount, then a purpose built implement which does not allow for interchangeable tools or implements, can be formed on the end of the boom or the lifting portion of the device. In this instance the functionally variable horizontal reach as discussed with respect to a load, will be understood to apply to the load that may be supplied by an implement powered or unpowered and or an external reaction on that implement such as the weight of a hay bale on the hay bale mover or the weight of a pallet or the pushing of a jackhammer on the ceiling.

Due to the wheels or transport means being able to be in a braked or unbraked condition, depending upon the actions of the operator, the main body 105 will be able to be pivoted around a fulcrum which will either be a portion of the transport means which contacts the ground if the transport means were in a braked condition or an axis of rotation of the transport means if it were in an unbraked condition.

It will be understood that, as an alternative, dependent upon the mode of operation, the brake may be adapted to stop only one of the two or more rotating elements, or less than the total of rotating elements on the rotatable support.

It will be understood that, as an alternative, the pivotal support bar may be rotatably connected between the longitudinal support members and fixedly attached to the first end of the boom to enable the boom to pivot substantially with respect to the manual manipulation point.

It will be understood that, as an alternative, the linear actuator may be any other suitable type of actuator, such as a hydraulic or pneumatic actuator, or a manual actuator. Alternatively other means could be used such as a winch, a ratchet winch which may or may not include a pulley system and the like; a gas strut for lift force and a winch and cable for lowering force; a machine screw or power screw arrangement; a hydraulic cylinder or similar means; a pneumatic cylinder or similar means; a winch and endless cable loop to drive a carriage on the main body which slidably and pivotally carries either a link to the boom or the boom; winch and pulley system; a gas strut for lift force assistance together with a linear actuator for lift and lowering forces and movements.

It will be understood that, as an alternative, a load cell may be connected within the hook arrangement and a digital indicator may be displayed on or near the hoist arm close to the manual manipulation point where it can easily be seen by the user when using the lifting device. In this way the user may monitor the weight of the load being lifted.

The invention claimed is:

1. A lifting device comprising:
   a) an elongated main body having opposed ends;
   b) a wheel assembly at one end of the main body which includes at least one ground engaging wheel which is rotatable about a rotation axis for facilitating movement of the device over a ground surface;
   c) the main body being mounted for pivotal movement at said one end of said main body in a main body pivot plane which is at right angles to the rotation axis;
   d) the main body extending in a lateral rearward direction with respect to the rotation axis;
   e) manually operable handle means at the other end of the main body at a manual manipulation point whereby the handle means, in use is gripped by a user so as to manoeuvre the device including the pivotal movement of the main body and the movement of the device over the ground surface;
   f) a boom portion having opposed ends, one end of the boom portion being operatively connected to the main body for pivotal movement in a boom portion pivot plane which is at right angles to the rotation axis, said one end of the boom portion being disposed rearwardly with respect to the rotation axis and extending forwardly therefrom;
   g) a load engaging device operatively connected to the other end of the boom portion;
   h) a motive power unit operatively connected to the main body and the boom portion for facilitating pivotal movement of the boom portion said motive power unit being powered by a power source;
   i) a brake associated with the ground engaging wheel and operable so that in a brake release position the ground engaging wheel is freely rotatable and in a braking position the ground engaging wheel is inhibited from rotation;
   j) a brake controller at the manipulation point and operable by the user to cause the brake to adopt the brake release position or the braking position;
   k) whereby in one operating mode the brake is in the brake release position and the pivotal movement of the main body is about the rotation axis, and in another operating mode, the brake is in the braking position and the pivotal movement of the main body is about a point of contact between the ground engaging wheel and the ground surface.

2. A lifting device according to claim 1 wherein said main body comprises first and second spaced apart longitudinal members each having opposed ends, one end of each member defining said one end of the main body, and the other end of each member defining the other end of said main body, said wheel assembly comprising a first ground engaging wheel at said one end of said first longitudinal member and a second ground engaging wheel at said one end of said second longitudinal member said ground engaging wheels being mounted for rotation about said rotation axis; said boom portion being mounted at said one end of said main body for pivotal movement in a plane which is at right angles to said rotation axis and between said first and second longitudinal members.

3. A lifting device according to claim 1 wherein a distance from said other end of said boom portion is more or less than a distance from the handle means to said rotation axis by an order of no more than +/−15%.

4. A lifting device according to claim 2 wherein said brake comprises a brake for each ground engaging wheel.

5. A lifting device according to claim 1 wherein said motive power unit comprises a linear actuator having opposed ends, one end of the linear actuator being operatively connected to said boom portion and the other end of the linear actuator being operatively connected to said main body.

6. A lifting device according to claim 5 wherein said other end of said linear actuator is operatively connected to said one end of said main body and said one end of said linear actuator is operatively connected to said boom portion intermediate the ends thereof.

7. A lifting device according to claim 2 wherein said handle means comprises two handles which are at respective ends of the longitudinal members.

8. A lifting device according to claim 1 including a motive power unit controller at said manipulation point.

9. A lifting device according to claim 1 wherein the main body and the boom portion are pivotally moveable relative to one another so as to be able to adopt an operative lifting position in which the main body and the boom portion are inclined relative to one another and a collapsed position in which the main body and the boom portion are substantially flat or nested together.

10. A lifting device according to claim 1 wherein said load engaging device comprises a hook in a region of said of other end of said boom portion.

11. A lifting device according to claim 1 wherein the lifting device is configured so that when in use in a load carrying mode, the main body is solely supported by the wheel assembly and a user of the manipulation point.

12. A lifting device according to claim 11 wherein the lifting device is configured so that in at least some modes of operation the load engaging device can be disposed forwardly of the rotation axis.

13. A lifting device according to claim 1 further including a jockey wheel assembly comprising at least one jockey wheel operatively connected to the main body in spaced relation to the wheel assembly and moveable between a support position in which the main body is inclined with respect to the ground surface and a retracted position.

14. A lifting device as claimed in claim 1 wherein said boom portion and/or said load engaging device includes one or more than one of the following: a load engager; lift formation; a load engager or lift formation which is removable or moveable with respect to said boom portion so as to be deployed or retracted or removed from deployment; a load engager or lift formation in the form of a hook; a load engager or lift formation which is secured internally or externally relative to said boom portion; an implement mounting means for mounting one of the following: forklift tynes, bale pins or tynes, barrel grab, container support, a lifting platform or surface, power tools, brick and/or block lifters, suction devices; suction devices to lift concrete or masonry blocks, suction devices for handling glass panels, a jackhammer, a concrete cutter, a drill, a tile remover or an auxiliary powered device; an implement; a bucket; a scraper; a power tool; an auxiliary powered device or other fixture to allow addition of power tools; an auxiliary powered device or other fixture to allow addition of suction devices; an auxiliary powered device or other fixture to allow addition of suction devices to lift concrete or masonry blocks; an auxiliary powered device or other fixture to allow addition of suction devices for handling glass panels; an implement mounting means wherein the implement and or an external reaction upon the implement places a load on the device via the implement mounting means.

* * * * *